United States Patent
Lahtinen et al.

(10) Patent No.: US 9,225,698 B2
(45) Date of Patent: Dec. 29, 2015

(54) FINE GRAIN RIGHTS MANAGEMENT OF STREAMING CONTENT

(75) Inventors: Pekka Ilmani Lahtinen, Helsinki (FI); Jukka Antero Alve, Vantaa (FI)

(73) Assignee: Nokia Technologies Oy, Espoo (FI)

( * ) Notice: Subject to any disclaimer, the term of this patent is extended or adjusted under 35 U.S.C. 154(b) by 2522 days.

(21) Appl. No.: 11/127,780

(22) Filed: May 12, 2005

(65) Prior Publication Data

US 2006/0259433 A1 Nov. 16, 2006

(51) Int. Cl.
*G06F 21/00* (2013.01)
*H04L 29/06* (2006.01)
*H04N 7/167* (2011.01)
*H04N 21/2347* (2011.01)
*H04N 21/258* (2011.01)
*H04N 21/266* (2011.01)
*H04N 21/4405* (2011.01)
(Continued)

(52) U.S. Cl.
CPC ............ *H04L 63/062* (2013.01); *H04L 9/0822* (2013.01); *H04L 63/068* (2013.01); *H04L 63/104* (2013.01); *H04N 7/1675* (2013.01); *H04N 21/2347* (2013.01); *H04N 21/25875* (2013.01); *H04N 21/26606* (2013.01); *H04N 21/26613* (2013.01); *H04N 21/4405* (2013.01); *H04N 21/4623* (2013.01); *H04N 21/63345* (2013.01); *H04N 21/835* (2013.01); *H04L 2209/56* (2013.01); *H04L 2209/603* (2013.01); *H04L 2463/101* (2013.01)

(58) Field of Classification Search
USPC .............. 705/51, 16, 21, 59, 71; 380/44, 262, 380/278, 279
See application file for complete search history.

(56) References Cited

U.S. PATENT DOCUMENTS

| | | | | |
|---|---|---|---|---|
| 7,050,583 | B2 * | 5/2006 | Montgomery | 380/37 |
| 2003/0140083 | A1 * | 7/2003 | Watkins | 709/102 |
| 2006/0206708 | A1 * | 9/2006 | Son et al. | 713/163 |

FOREIGN PATENT DOCUMENTS

| AU | 2006245453 A1 | 11/2006 |
|---|---|---|
| GB | 2407947 A | 5/2005 |

(Continued)

OTHER PUBLICATIONS

PCT Written Opinion of the International Searching Authority for International Application No. PCT/IB2006/001047, mailed Oct. 16, 2006, 7 pages.

(Continued)

*Primary Examiner* — Dante Ravetti
(74) *Attorney, Agent, or Firm* — Ditthavong & Steiner, P.C.

(57) ABSTRACT

The present invention provides methods, apparatuses, and systems for delivering protected streaming content to a receiving device. In an aspect of the present invention, a broadcaster provides streaming content. To ensure viewers are properly authorized, the streaming content is encrypted with a traffic key. The traffic key is provided to the users via a key stream message, which is encrypted with a service key. The user obtains at least one rights object from a rights issuers and the at least one rights object includes the service key so that the streaming content may be used. The at least one rights object also contains information regarding usage rights that may be configured by the rights issuer so that, depending on the user and/or the receiving device, different rights may be available. The key stream message may include a program category variable value that indicates the type of content and in conjunction with the rights object, determines what usage rights exist for the streaming content.

15 Claims, 33 Drawing Sheets

(51) Int. Cl.
*H04N 21/4623* (2011.01)
*H04N 21/6334* (2011.01)
*H04N 21/835* (2011.01)
*H04L 9/08* (2006.01)

(56) References Cited

FOREIGN PATENT DOCUMENTS

| WO | 03055219 A2 | 7/2003 |
|---|---|---|
| WO | 2004077911 A2 | 9/2004 |
| WO | 2004114099 A1 | 12/2004 |
| WO | WO 2006/120516 A2 | 11/2006 |

OTHER PUBLICATIONS

Doc #OMA-BCAST-2005-0122—Service-Content-Protection-Architecture.doc, Change Request submitted Mar. 15, 2005, 2005 Open Mobile Alliance Ltd., 5 pages, available at http://member.openmobilealliance.org/ftp/public_documents/bac/BCAST/2005/OMA-BCAST-2005-0122-Service-Content-Protection-Architecture.doc, Retrieved Oct. 6, 2005.

Doc #OMA-BCAST-2004-0128RO3-CR-AD-four-layer-model.doc Change Request submitted Nov. 9, 2004, 2004 Open Mobile Alliance Ltd., 2 pages, available at http://member.openmobilealliacne.org/ftp/public_documents/bac/BCAST/2004/OMA-BCAST-2004-0128RO3-CR-AD-four-layer-model.doc, Retrieved Oct. 6, 2005.

Korean Office Action for corresponding KR Application No. 10-2007-7028060, Oct. 30, 2009, Korea.

Chinese Office action of corresponding CN App. No. 200680020948.7 dated Jan. 20, 2011, China, pp. 1-10.

Japanese Office action for corresponding JP application No. 2008-510658 dated Jan. 31, 2011, pp. 1-4.

Service/Content Protection Architecture, Verma, et al., Open Mobile Alliance, OMA-BCAST-2005-0122R01-Service-Content-Protection-Architecture.doc, Change Request, Apr. 2, 2005, pp. 1-8.

Office Action of corresponding Chinese Application No. 200680020948.7 dated Jan. 22, 2010, China. pp. 1-16.

Office Action of corresponding Mexican Application No. MX/a/2007/013885, dated Jan. 26, 2010, Mexico. English Translation of Relevant Portion. pp. 1-3.

Korean Office Action for corresponding KR Application No. 10-2007-7028060, Apr. 26, 2010, Korea, pp. 1-10.

Chinese Office action of corresponding CN App. No. 200680020948.7 dated Jul. 7, 2010, China, pp. 1-9.

Chinese Office action of corresponding CN App. No. 200680020948.7 dated Oct. 12, 2010, China, pp. 1-6.

Office Action for related European Patent Application No. 06 727 549.5 dated Dec. 3, 2013.

European Office Action for related European Application No. 06727549.5-1853 dated Jan. 5, 2015, 7 pages.

ETSI EN 301 192, "Digital Video Broadcasting (DVB); DVB specification for data broadcasting", Final draft ETSI EN 301 192, ETSI European Standard, V1.4.1, Jun. 2004, pp. 78.

* cited by examiner

FINE GRAIN RIGHTS MANAGEMENT OF STREAMING CONTENT

FIELD OF THE INVENTION

This invention relates to delivering protected multi-media content. In particular, the invention provides apparatuses and methods for use in providing improved control over user rights to portions of the protected content.

BACKGROUND OF THE INVENTION

Video streaming, data streaming, and broadband digital broadcast programming are increasing in popularity in wireless network applications, e.g., Internet Protocol (IP) multicast services. To support these wireless applications, wireless broadcast systems transmit data content that support data services to many wireless terminals simultaneously. Digital media content or other data is broadcasted using various application protocols, transport protocols and network protocols. For example, a broadcast system provides IP data broadcast where audio-visual service is transmitted so that MPEG4-AVC video, MPEG4-AAC audio and auxiliary data components are packetized and encapsulated to RTP and/or ALC. The packets are subsequently formatted to UDP and IP and transmitted over MPE in MPEG2-TS (for example DVB-H). In a packet-switched domain, the concept of a multi-media session may require that one or more session components (audio, video and auxiliary data in above case) are logically bound together. The portions of the multi-media session are sent between a common start time and end time. However, with a broadcast environment all receivers that are able to receive the broadcast signal can receive the data carried by the broadcast signal. It is important that the content seller limits access to multi-media content so that only entitled receivers can present the multi-media content to users.

Digital Rights Management (DRM) systems, like Open Mobile Alliance (OMA) DRM system, are being used for selling access to discrete files, like OMA DRM Digital Content Files (DCF). As one possible solution, a device (as instructed by its human user) from a Content Provider obtains the DCF (e.g. an MP3 music file), which is encrypted by a content key. The device separately obtains (i.e. purchases) from a Rights Issuer (RI) a Rights Object (RO) that may include (among other things) two parts: the content key for decrypting the DCF, and usage rights for the DCF. Usage rights control the way in which the device (and thus its human user) may use the decrypted DCF content; for instance, time limits for using the content, whether the content may be copied, etcetera. Different RIs may sell ROs for the same DCF at different prices and with different usage rights.

Often, e.g. in the case of OMA DRM, usage rights are expressed in a Rights Expression Language (REL) which may contain conditionality based on variables like days of week, time of day, period of days, etc. . . . For example, it may be stated that a particular usage right extends for a period of time. Examples of REL include Open Digital Rights Language (ODRL) and eXtensible rights Markup Language (XrML).

Recently, DRM systems are being deployed for selling streaming services, too, in addition to discrete DCF files. A special case of such streaming services is true radio broadcast streaming services (broadcast services hereinafter), where multiple devices receive the same broadcast stream. For instance OMA DRM has been suggested for selling and purchasing IP datacast (IPDC) services, and the solution is being standardized by the Digital Video Broadcasting (DVB) organization, in order to (among other things) support handheld television receivers on top of DVB-H (handheld) radio broadcast technology.

Typical organizational roles in broadcast services include: 1) a broadcaster who obtains the streaming content from content providers and broadcasts it encrypted over the radio path, and 2) multiple RIs, who sell ROs for decrypting the content and setting the usage rights for it in the devices receiving the broadcast. The ROs may be delivered over the same broadcast radio path as the encrypted content itself, or via separate interaction channels such as cellular data carriers (e.g. GSM GPRS, General Packet Radio Service).

In such a scenario, it is typically not feasible for the key in each RO to decrypt the streaming content directly, since the streaming content is continuous (unlike discrete DCF files). One known technique of content decryption is a key hierarchy such as is used in DVB conditional access. Broadcaster sends sequences of streaming content each encrypted by a traffic key (TK), periodically changing the traffic key. At least whenever the traffic key changes, a Key Stream Message (KSM) is sent, containing the traffic key encrypted by a service key (SK). The ROs contain the service key. Therefore, receiving devices may use the service key in the ROs to decrypt the traffic keys in the KSMs. The receiving devices may then use the traffic keys to decrypt the streaming content. In practice, the KSMs must be broadcast very frequently so as to enable quick "channel switch" from one service to another.

The service key also changes periodically, although the frequency of change is typically much lower. A new service key is then required for the device to continue to decrypt the streaming content. Therefore, a new RO with the new service key may be obtained by devices to replace old ones. Accordingly, ROs have a certain validity period, which equals the time during which the service key can be used to decrypt the traffic keys so as to decrypt the streaming content.

As specified above, a RO for a broadcast service serves to decrypt and make accessible streaming content, for the validity period of the RO. Like in the DCF case, the RO can also be used to state usage rights expressed in REL for the same validity period. As an example, consider the DVB-H based handheld television broadcast service. Typically devices are allowed to render on a display (so that a human user may view) the television service, such as a program on a channel, as it is received. Usage rights may state what the device/user may do with the streaming content, which may be the television service. For example, the usage rights may provide that the content may be recorded, may be played back at a later time, may be copied to another device, may only be viewed or whatever rights are desired to be provided.

While this methodology provides a certain level of functionality, there is a problem. Each RO can only state one set of usage rights for the validity period. This level of control may be insufficient. For example, there may be different types of television programs in a handheld television broadcast service that the RIs may wish to provide different levels of control regarding usage. The RIs may wish to allow a liberal "do anything" usage rights for certain types or portions of content such news, advertisements or quizzes but restrict usage rights for other types or portions of content such as premium sporting events or feature movies. Thus, while ROs with relatively long validity periods are fine for streaming content access (i.e. decryption), it would be useful to provide a more fine grained means of providing usage rights with increased frequency and/or precision within the validity period of the RO so that the usage of the type or portion of the content is in accordance with the usage rights intended to be granted for the type or portion of content.

Furthermore, rights to certain content may vary depending on the time of day or the day of the week. In addition, a user may have different rights for different portions of the content. For example, in order to enhance revenue collections, a user is often permitted to access premium multi-media services only if the user subscribes to the service or orders the service (e.g., pay per view). However, the content may also be separated into time periods. Thus, for example, a user may decide to subscribe to a weekend edition rather than a full week subscription. The RIs may wish to allow some of the content available in the weekend edition subscription to be saved and forwarded freely to others while limiting other portions of the content to a single use or to a more controlled distribution set.

BRIEF SUMMARY OF THE INVENTION

With an aspect of the invention, a selector consisting of a few bits, transmitted frequently, can select the rights for a particular portion of content from a set of rights previously acquired and contained within one or more ROs. As the selector is relatively small, frequent transmission of the selector has little impact on the available bandwidth. The one or more ROs, which change much less frequently, can provide the details of the rights, therefore resulting in bandwidth savings in the broadcast channel. Thus, the one or more RO can still utilize the full richness of the REL to define what the rights are for each portion of the content.

Another aspect of the present invention provides methods, apparatuses, and systems for delivering protected multi-media content to a receiving device. Portions of protected multi-media content and associated key information are inserted in a same time slice burst. Consequently, key information may be frequently changed while maintaining synchronization with the multi-media content. In one embodiment of the invention, time slice bursts are sent from a transmitting apparatus to a receiving device by a communications system that includes a DVB-H system, a DVB-T system, an ATSC system, and an ISDB-T system. The KSMs, which are sent very frequently, each contain a small amount of program category information which translates into a REL variable and thereby selects conditional usage rights from the ROs of all RIs, or (as another implementation) from the RO of each RI individually. In an embodiment, the selection may be television program specific.

With another aspect of the invention, the program category information sent in the KSM could be used to select one of a set of complete ROs, or possibly one of several child ROs related to the same parent RO.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

To aid in organization and for the ease of the reader, the detailed description is provided in two sections. First, in FIGS. 1-27, details regarding methods of sending and receiving content in accordance with aspects of the present invention are provided. Next, in FIGS. 28-33, details regarding methods and apparatus for controlling usage rights for portions of content are disclosed.

Methods and Apparatus for Providing Streaming Content

Figure 1:
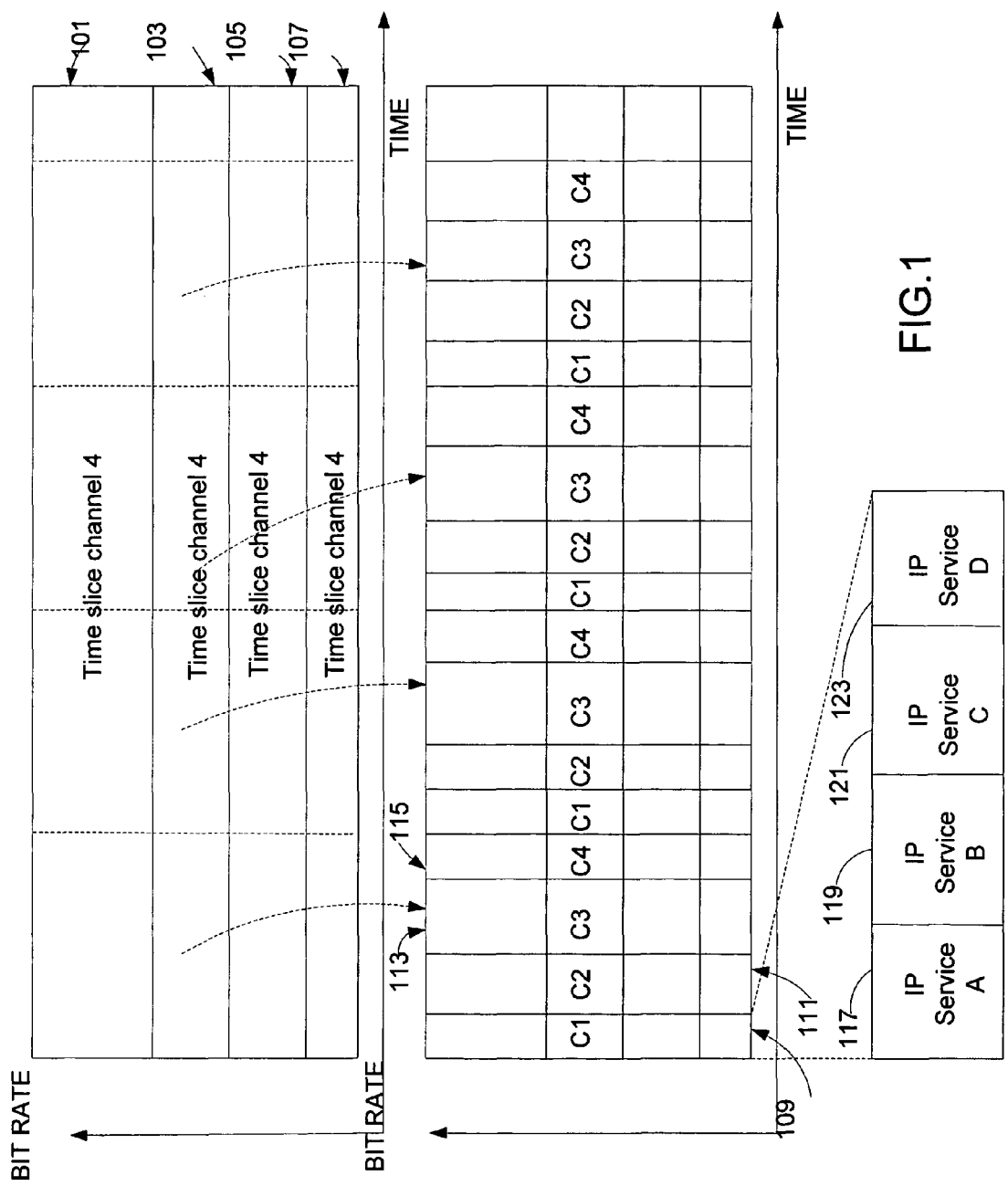
FIG. 1 shows transmission of Internet Protocol (IP) services utilizing time slice transmission in accordance with an embodiment of the invention.

FIG. 1 shows transmission of Internet Protocol (IP) services utilizing time slice transmission in accordance with an embodiment of the invention. A base station broadcasts data packets for a plurality of IP services using data streams 101, 103, 105, and 107. (Each data stream is allocated a portion of a data rate capacity.) In the embodiment, the base station may support functionality that is typically assumed by a base transceiver station (BTS), a base station controller (BSC), a combination of a BTS and a BSC, and a node B, which is a third Generation (3G) designation of a base transceiver station. Data transmission is essentially continuous such that data packets for an IP service are continuously being conveyed through a data stream.

In order to mitigate the loss of data packets, data streams 101, 103, 105, and 107 are mapped by base stations into bursts of data packets 109, 111, 113, and 115, respectively, in which bursts are transmitted over radio channels rather than data streams 101, 103, 105, and 107. Each data stream (101, 103, 105, and 107), and consequently each burst (109, 111, 113, and 115), supports at least one data service. Thus, each burst may support a plurality of data services (e.g., a group of related data services).

Data rates associated with bursts 109, 111, 113, and 115 are typically greater than data rates that are associated with data streams 101, 103, 105, and 107 so that a corresponding number of data packets can be sent in a shorter amount of time. In the embodiment, data streams 101, 103, 105, and 107 correspond to continuous data rates of approximately 100 Kbit/sec. Bursts 109, 111, 113, and 115 typically correspond to approximately 4 Mbit/sec (but may be in excess of 10 Mbit/sec) with an approximate one second duration. However, other embodiments may use different data rates for data streams 101-107 and for bursts 109-115.

In the embodiment, the entire data rate capacity is allocated to a burst at a given time. As shown in FIG. 1, bursts 109, 111, 113, and 115 are interleaved in time. An idle time duration (during which data packets are not transmitted for the particular data service) occurs between consecutive transmissions of a burst (e.g., burst 109). A wireless broadcast system can utilize the idle time duration during which the wireless terminal can be instructed to transfer to another base station to complete a handover. The other base station may transmit the same data as the base station previously serving the wireless terminal using a different center frequency and a different amount of phase shift. The utilization of time slicing enables a terminal to reduce the consumption of electrical power that is provided by a power source (typically a battery).

Bursts are typically transmitted periodically by a base station. For example, a subsequent burst may occur T seconds after burst 109, in which a burst is transmitted every T seconds. The wireless terminal may maintain precise timing, as with the Global Positioning System (GPS), to determine an absolute time at which each burst occurs. In another embodiment, the wireless terminal is provided information about a time period in each burst, informing the wireless terminal about the subsequent burst. With an embodiment of the invention, the time period information includes a real-time parameter (corresponding to "delta-t" with DVB-H) that indicates a time interval from the beginning of a time slice burst to the beginning of the next time slice burst of the same service and that is signaled in a MPE section header. The time period may be included in an IP packet, a multiprotocol encapsulated frame, any other packet frame, and a third generation (3G) or General Packet Radio Service (GPRS) channel or modulation data, such as transmitter parameter signaling. Alternatively, the wireless terminal may detect an occurrence of a burst by receiving a signal preamble, which may be a data sequence that is known a priori to the wireless terminal. In another embodiment, the wireless terminal may receive an overhead message on an overhead channel from a base station. The overhead message may contain timing information regarding the occurrence of bursts. The overhead channel may be logically or physically distinct from the downlink radio channel that supports the transmission of bursts.

Bursts 109, 111, 113, and 115 may be formatted by using a multi-protocol encapsulation in accordance with Section 7 of European Standard EN 301 192 "Digital Video Broadcasting (DVB), DVB specification for data broadcasting." The encapsulation may conform to Internet Protocol (IP) standards.

In an embodiment of the invention, a Digital Video Broadcast (DVB-H) provides mobile media services to wireless terminals, e.g., handheld wireless units. In the embodiment, the DVB-H system is compatible with DVB-T (digital video broadcast for terrestrial operation) and supports enhancements to better support operation of wireless handheld terminals. The DVB-H system supports Internet Protocol (IP) based data services in which the information may be transmitted as IP datagrams. The DVB-H system incorporates enhancements (with respect to a DVB-T system) that facilitates access to IP based DVB services on wireless handheld wireless terminals. (Alternative embodiments of the invention support variations of digital video broadcast systems including DVB-T, ATSC, and ISDB-T.) The DVB-H enhancements are based on the physical layer of the DVB-T physical layer with a number of service layer enhancements aimed at improving battery life and reception in the handheld environment. Thus, the DVB-H enhancements compliment existing digital terrestrial services, offering service providers the possibility to extend the market to the wireless handheld market.

Figure 2:
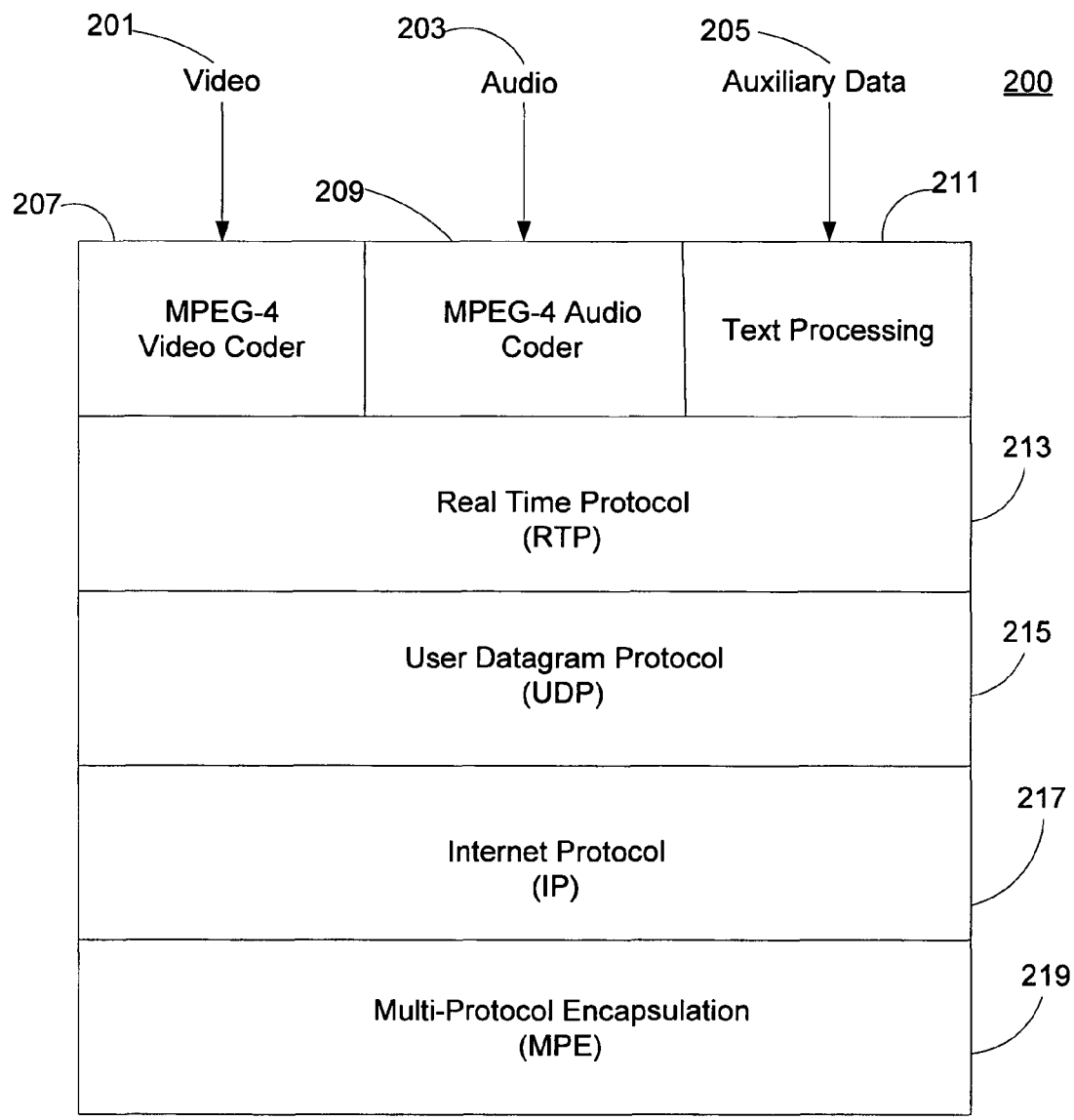
FIG. 2 shows a protocol stack that supports transmission of multi-media data in accordance with an embodiment of the invention.

FIG. 2 shows an internet protocol (IP) stack 200 that supports transmission of multi-media data in accordance with an embodiment of the invention. Digital media content or other data is broadcasted using various application protocols, transport protocols and network protocols. With IP stack 200, an IP data broadcast supports an audio-visual service having MPEG4-AVC video 201, MPEG4-AAC audio 203 and auxiliary data 205 components. Each component (201, 203, or 205) is processed by coder 207, coder 209, or coder 211 in order to obtain packets that are formatted for Real Time Protocol (RTP) layer 213. The packets (datagrams) are subsequently processed by UDP (user datagram protocol) layer 215 and Internet Protocol (IP) layer 217. Datagrams are associated with time slice bursts by formatting the datagrams using a multi-protocol encapsulation (typically corresponding to a link layer in the OSI model) such as, for example, in accordance with Section 7 of European Standard EN 301 192 "Digital Video Broadcasting (DVB), DVB specification for data broadcasting." The encapsulation may conform to Internet Protocol (IP) standards.

A multi-media session typically is associated with one or more session components (audio, video and auxiliary data in above case) that are logically bound together. The parts of the session are sent between a common start time and end time. Both start time and/or end time of can be either defined or undefined.

Figure 3:
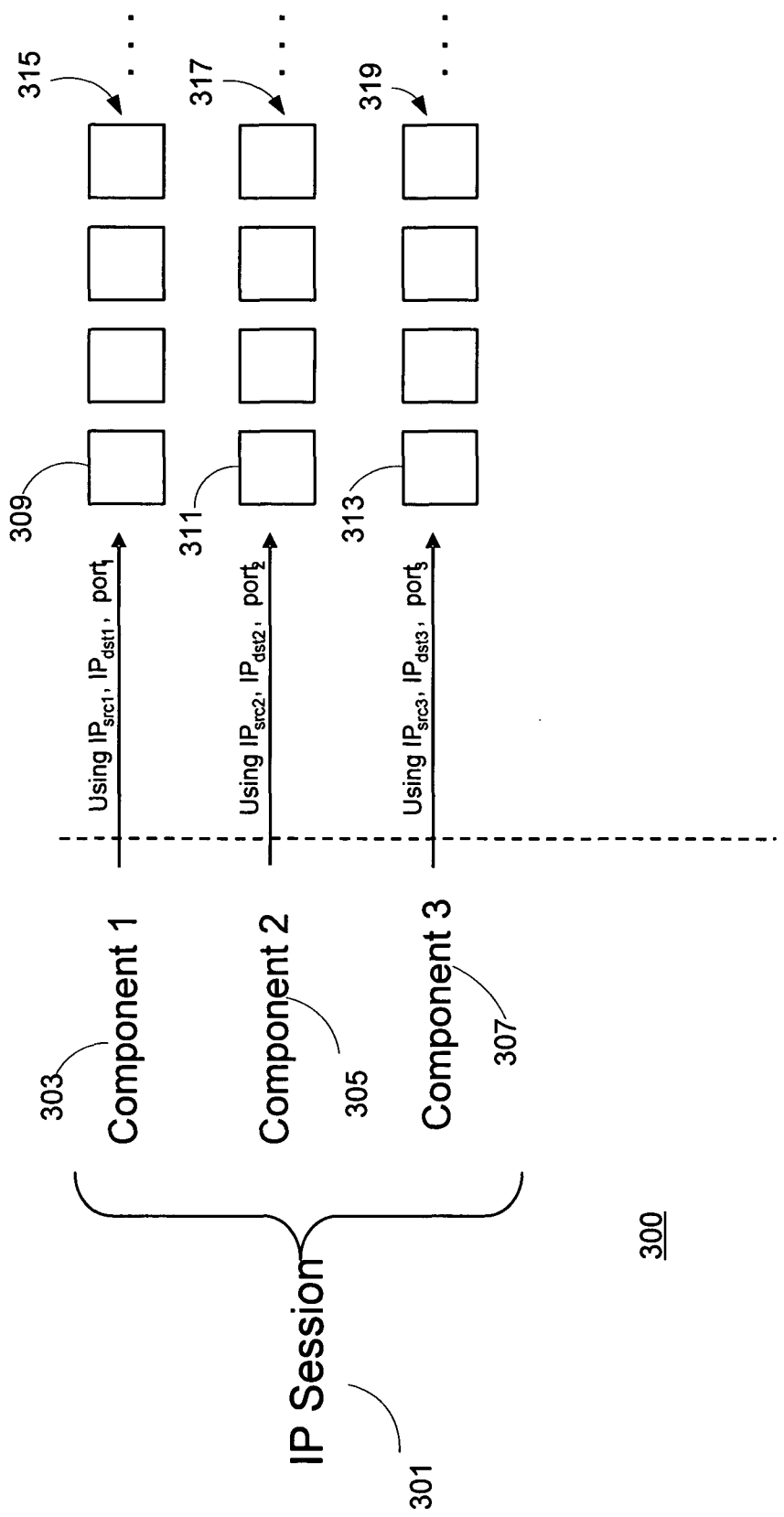
FIG. 3 shows a component configuration for a multi-media session according to an embodiment of the invention.

FIG. 3 shows a component configuration 300 for a multi-media session 301 according to an embodiment of the invention. Component 303 corresponds to a plurality of datagrams (including datagrams 309 and 315); component 305 corresponds to a plurality of datagrams (including datagrams 311 and 317); and component 307 corresponds to a plurality of datagrams (including datagrams 313 and 319). Components 303, 305, and 307 are transmitted within IP packets that are encapsulated to messaging of an underlying bearer layer. Each component 303, 305, and 307 has a defined source IP address, destination IP address, and port used in the IP packets that carry data associated with the component. Different components may have an independently defined source IP address, a destination IP address, and a port. In variations of the embodiment, a multi-media session may have a different number of components.

While exemplary component configuration 300 shows datagram alignment between components 303, 305, 307, the embodiment supports configurations in which the datagrams are not aligned and the number of datagrams for each component is different from that of the other components. For example, the number of datagrams for an audio component is typically less than the number of datagrams for a video component during a given time interval.

Figure 4:
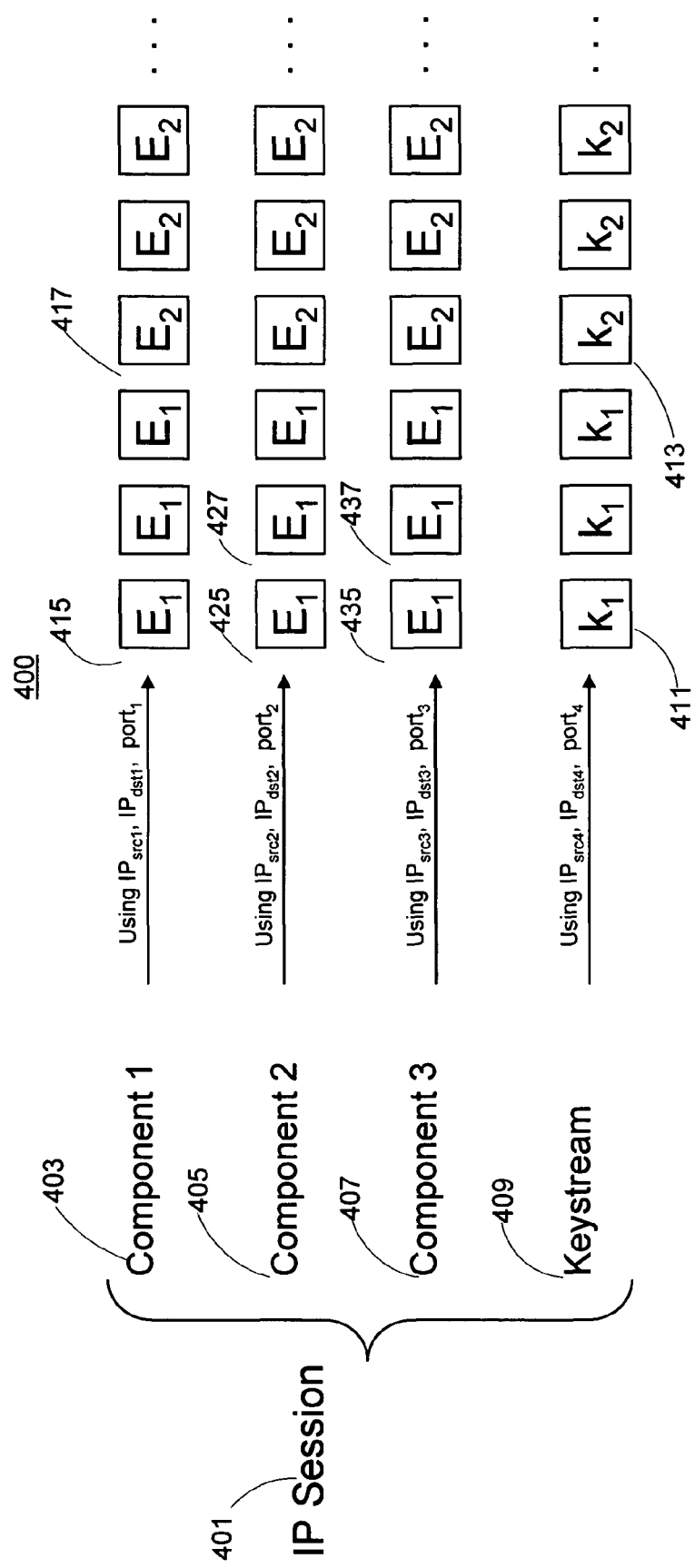
FIG. 4 shows a component configuration for a multi-media session shown according to an embodiment of the invention.

FIG. 4 shows a component configuration 400 for a multi-media session 401 according to an embodiment of the invention. Components 403, 405, and 407 are encrypted with the same key that changes periodically in keystream 409 during multi-media session 401. (In FIGS. 4-16, a datagram that is encrypted with key $k_i$ is denoted as $E_i$. (Keystream 409 is a logical channel that contains key information and that is separate from the media components.) Similarly, a datagram associated with the $j^{th}$ component and that is encrypted with the $i^{th}$ key associated with the $j^{th}$ component is denoted as $E_{ji}$.) The embodiment supports different encryption methods that are applied to component 403, 405, or 407, including:

IPSEC-ESP (so called IP-level encryption; see RFC on IPSEC-ESP)
Payload of the application session packet encrypted (for example SRTP or DCF of OMA DRM 1.0 or 2.0)
Encryption The above encryption methods may be applied separately or in combination during multi-media session 401. Components 403, 405, and 407 correspond to a different plurality of content datagrams. Keystream 409 includes a plurality of associated datagrams, each associated datagram corresponding to an encryption key. Encryption is typically performed on an individual datagram (e.g., packet) basis. For example, content datagrams 415, 425, 427, 435, and 437 are encrypted with key $k_1$ (corresponding to associated datagram 411) and content datagram 417 is encrypted with $k_2$ (corresponding to associated datagram 413).

Keystream 409 utilizes a delivery protocol such as RTP, ALC/FLUTE, UHTTP, DVBSTP, IP with a payload, and UDP with a payload. The keys delivered in keystream 409 are typically protected by another key that the entitled receiver has in order to access the contents of keystream 409 that carries keys, thus enabling access to the components 403, 405, and 407. The delivery of keystream 409 is optionally synchronized with components 403, 405, and 407, e.g., RTP timestamps with the use of RTP Control Protocol).

Figure 5:
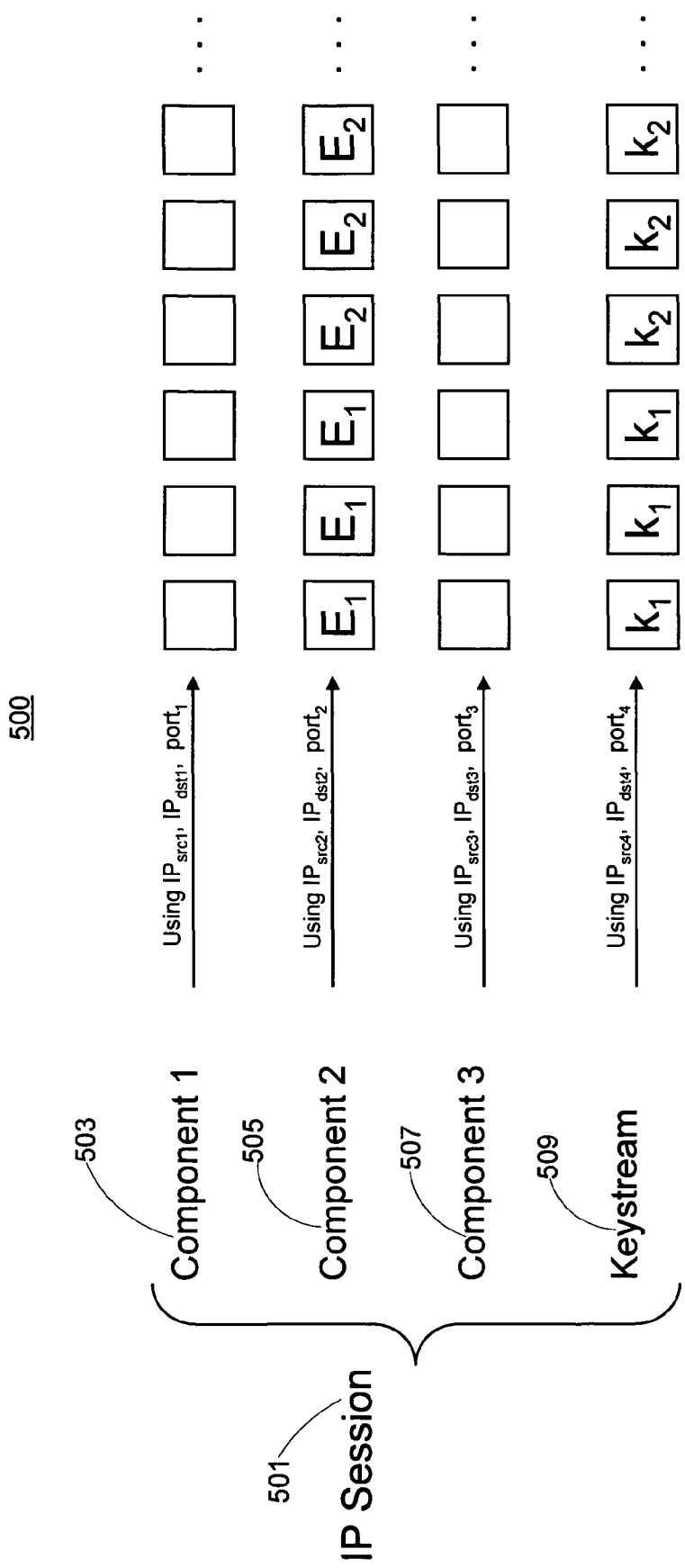
FIG. 5 shows a variation of the component configuration shown in FIG. 4 according to an embodiment of the invention.

FIG. 5 shows a variation of the component configuration shown in FIG. 4 according to an embodiment of the invention. Component configuration 500 is similar to component configuration 400. Multi-media session 501 includes components 503, 505, and 507 and keystream 509. Component 505 is encrypted with keys from keystream 509, while components 503 and 507 are not.

Figure 6:
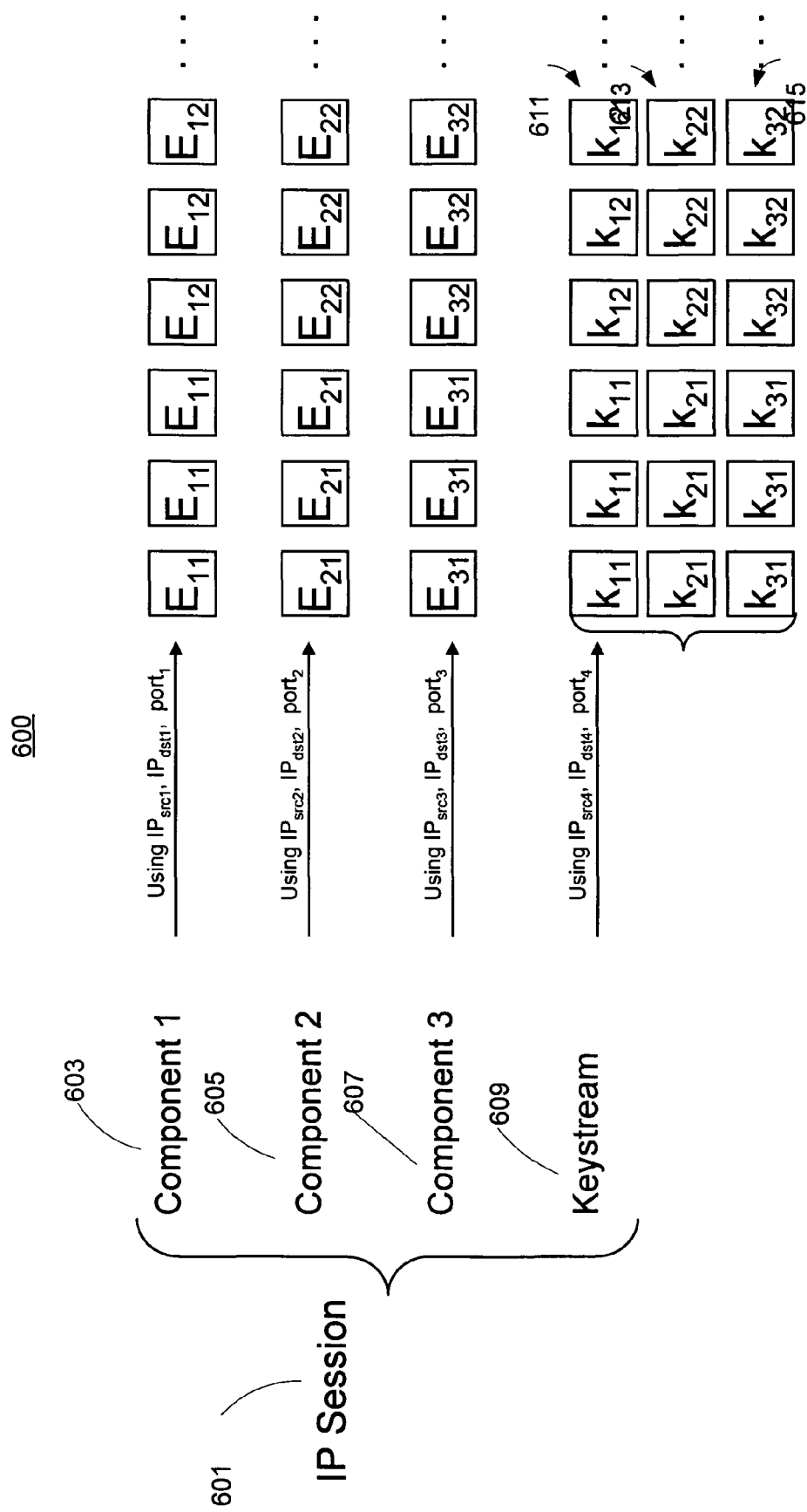
FIG. 6 shows a variation of the component configuration shown in FIG. 4 according to an embodiment of the invention.

FIG. 6 shows a variation of the component configuration shown in FIG. 4 according to an embodiment of the invention. Component configuration 600 is similar to component configuration 400. However, keystream 609 includes three series of keys 611, 613, and 615 that correspond to components 603, 605, and 607, respectively. The keys may change periodically but independently during multi-media session 601 but may be synchronized with each other.

Figure 7:
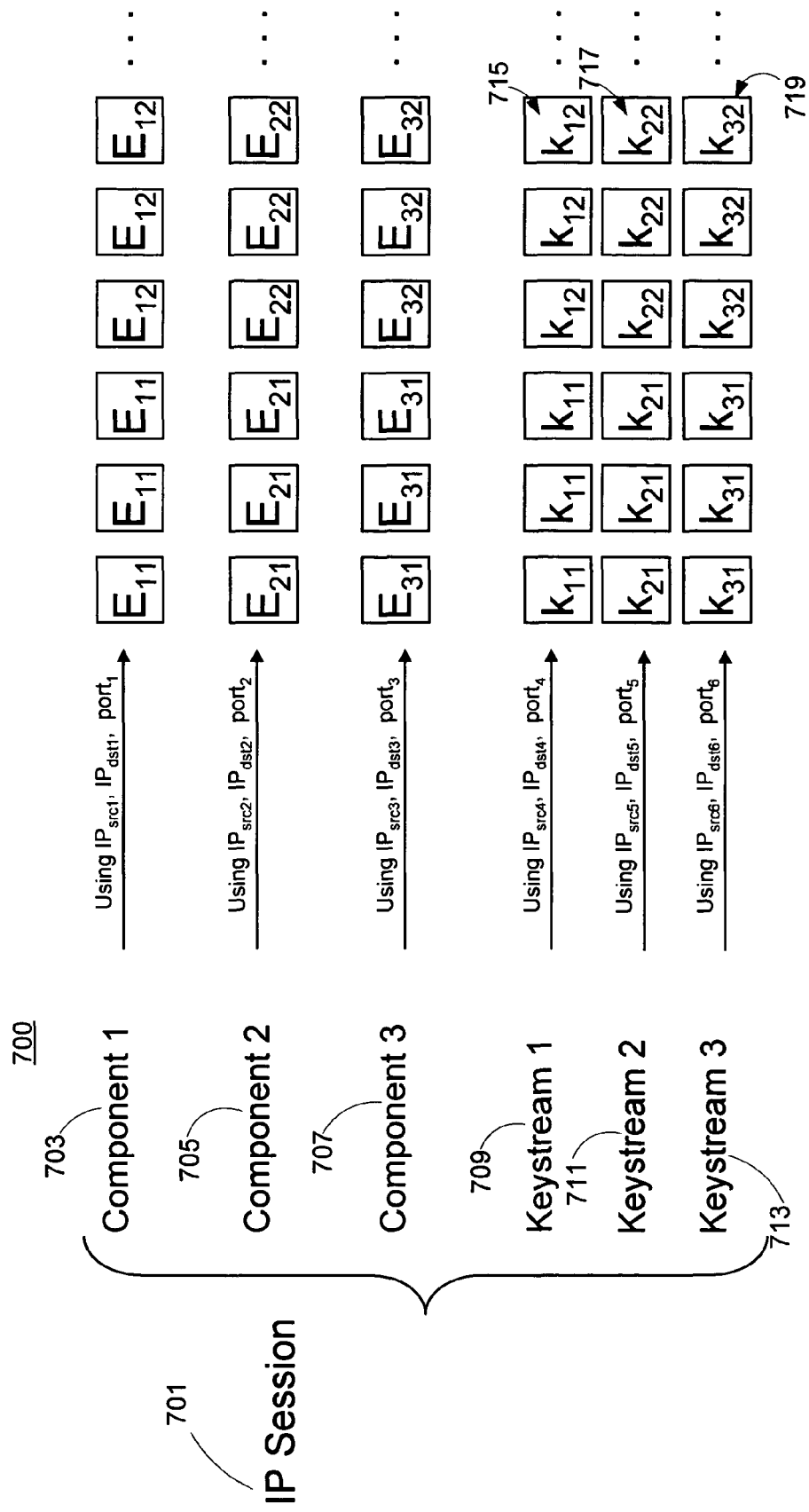
FIG. 7 shows a variation of the component configuration shown in FIG. 4 according to an embodiment of the invention.

FIG. 7 shows a variation of the component configuration shown in FIG. 4 according to an embodiment of the invention. Component configuration 700 is similar to component configuration 600 except that keys for each component are carried on different keystreams that change during multi-media session 701. Rather than having one keystream, component configuration 700 utilizes three keystreams 709, 711, and 713. Keystreams 709, 711, and 713 correspond to components 703, 705, and 707, respectively.

Figure 8:
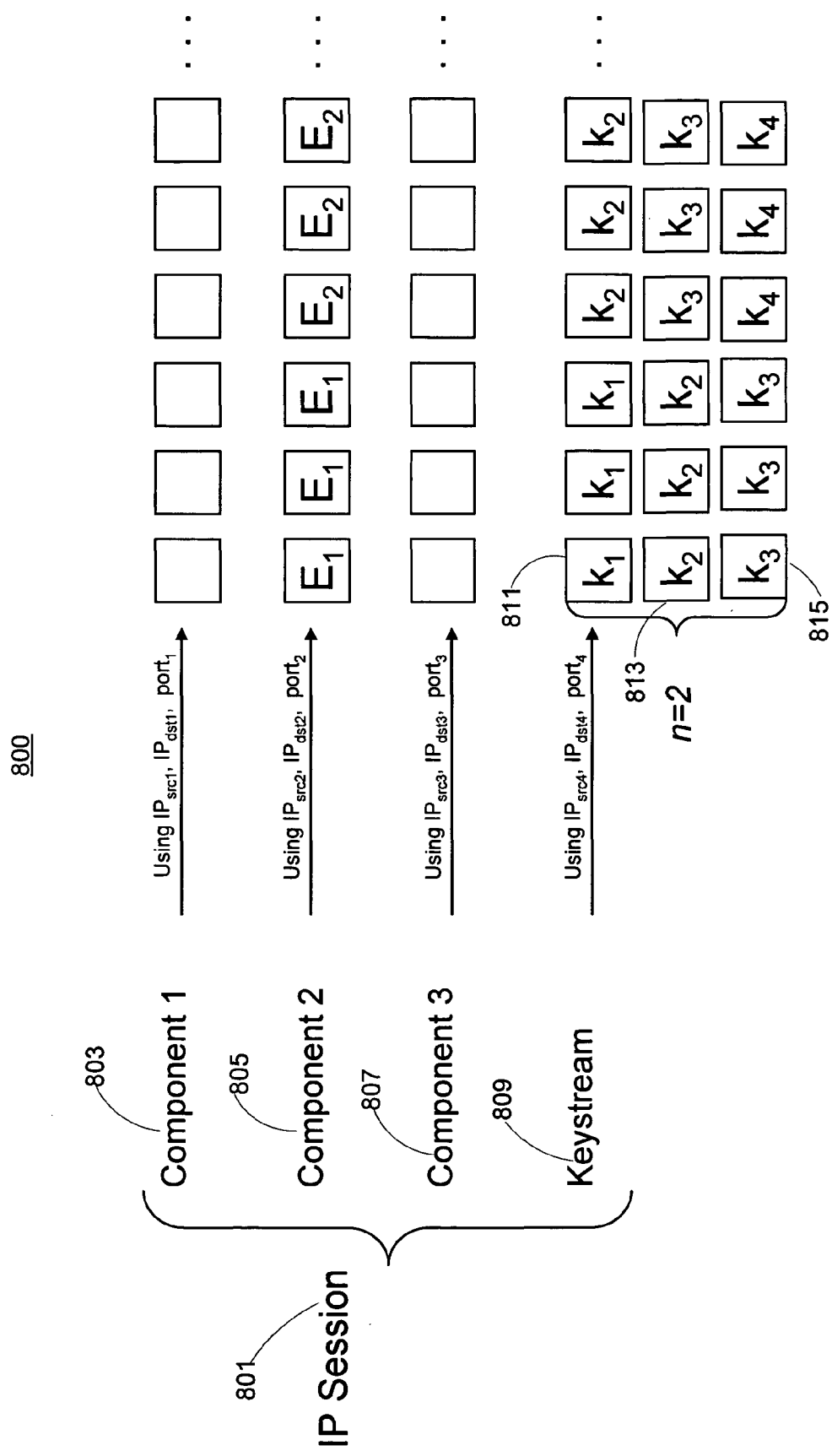
FIG. 8 shows a variation of the component configuration shown in FIG. 4 according to an embodiment of the invention.

FIG. 8 shows a variation of the component configuration shown in FIG. 4 according to an embodiment of the invention. With component configuration 800, component 805 is encrypted with keys from keystream 809. However, keystream 809 provides keys that are currently applicable to decrypting component 805 as well as keys that will be subsequently used in decrypting component 805. In the example shown in FIG. 8, key $k_1$ (corresponding to datagram 811) is currently applied while keys $k_2$ (corresponding to datagram 813) and $k_3$ (corresponding to datagram 815) are subsequently applied. While components 803 and 807 are not encrypted during multi-media session 801, components 803 and 807 may be encrypted with other variations of the embodiment. Having keys that will be subsequently applied enables a receiver device to smoothen key transitions during multi-media session 801. For example, the receiver device can configure the IP stack with a new key to reduce interruptions in decrypting content datagrams.

Figure 9:
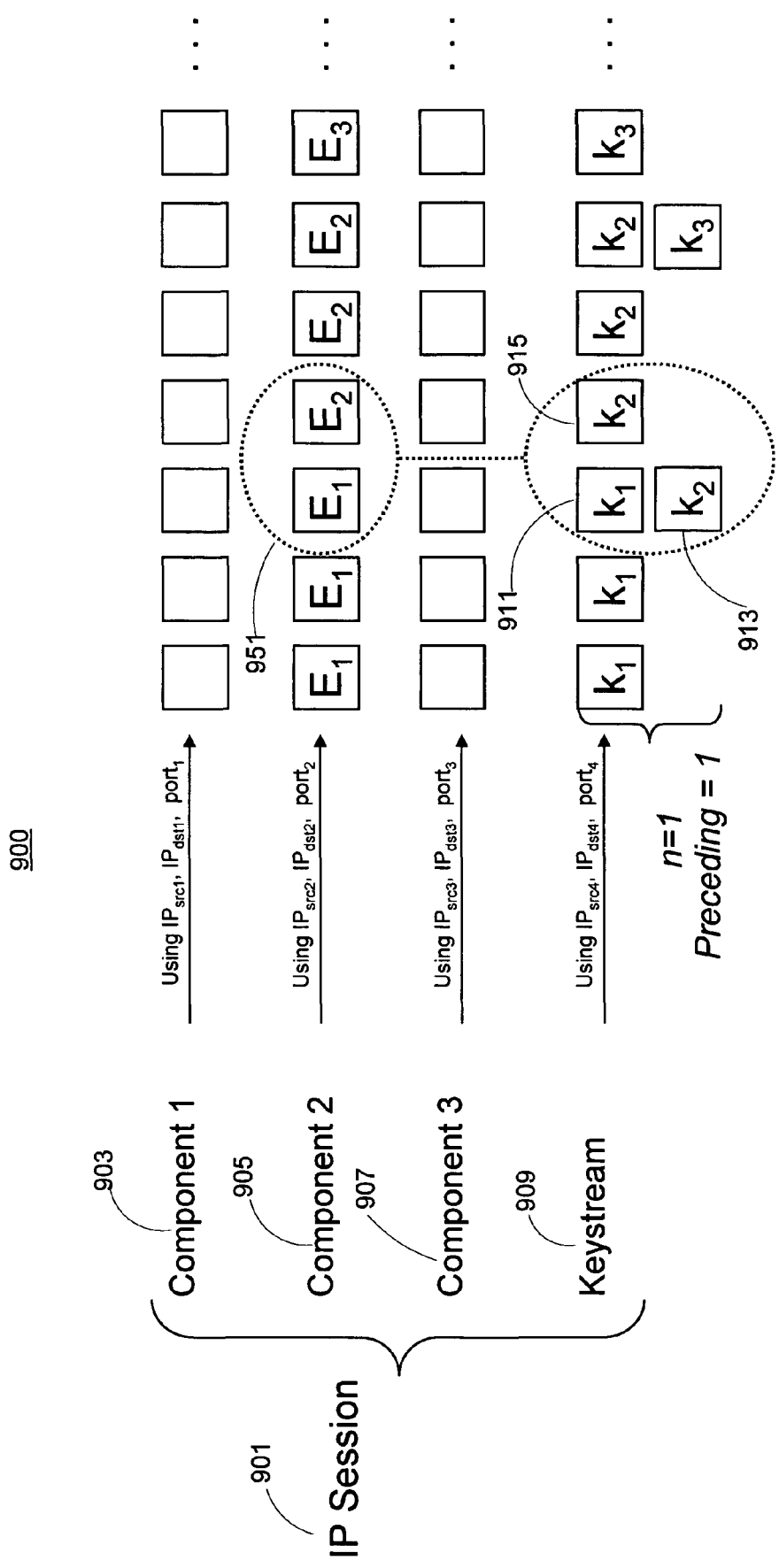
FIG. 9 shows a variation of the component configuration shown in FIG. 4 according to an embodiment of the invention.

FIG. 9 shows a variation of the component configuration shown in FIG. 4 according to an embodiment of the invention. Keystream 909 includes the key currently being applied to component 905 for encryption as well as keys that will be subsequently applied when the key transition is within a predetermined incremental time of the current time. For example, before key transition 951, keystream 909 includes both keys $k_1$ (corresponding to datagram 911) and $k_2$ (corresponding to datagram 913) and includes only $k_2$ (corresponding to datagram 915) after the key transition 951. As with component configuration 800, component configuration 900 assists the receiver device to smoothen the effects of key transitions.

Figure 10:
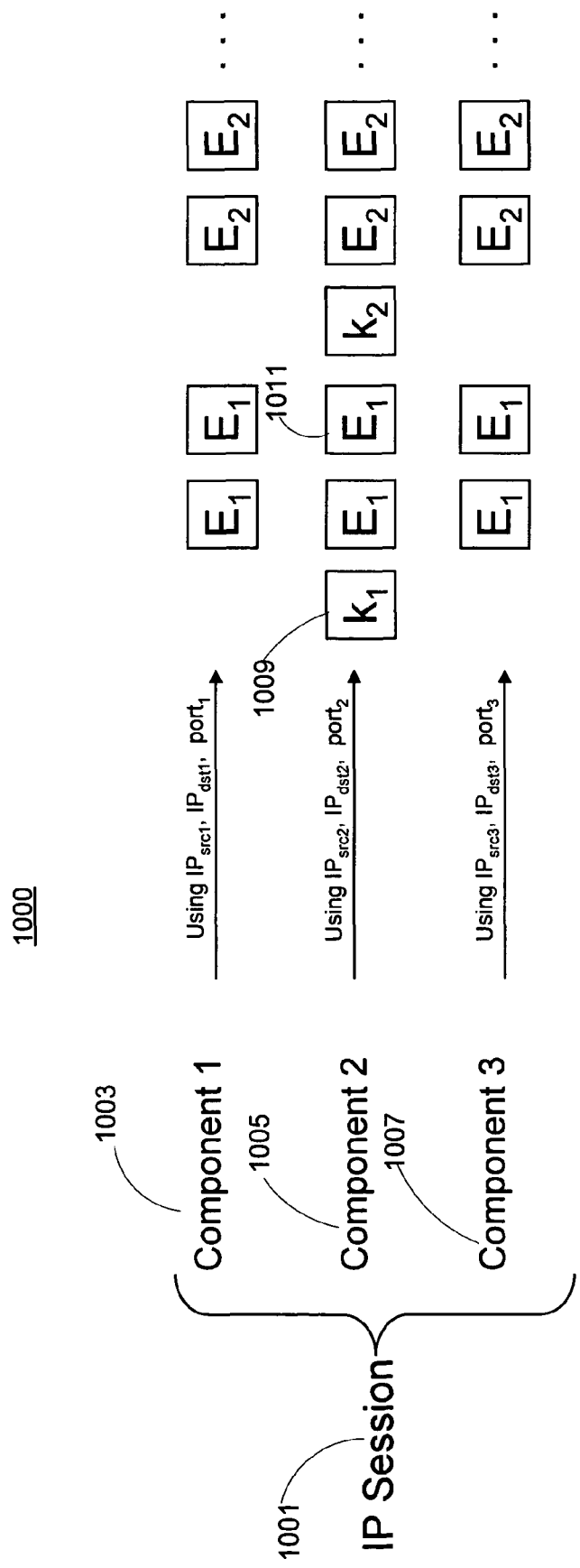
FIG. 10 shows a component configuration for a multi-media session according to an embodiment of the invention.

FIG. 10 shows a component configuration 1000 for a multimedia session 1001 according to an embodiment of the invention. However, in comparison with component configurations 400-900, keys are carried in one or more of the components rather than having a separate keystream for transmitting the keys. With component configuration 100, component 1005 includes content datagrams (e.g., content datagram 1011) as well as datagram 1009 that provides key $k_1$ that has been used for encrypting components 1003, 1005, and 1007.

Figure 11:
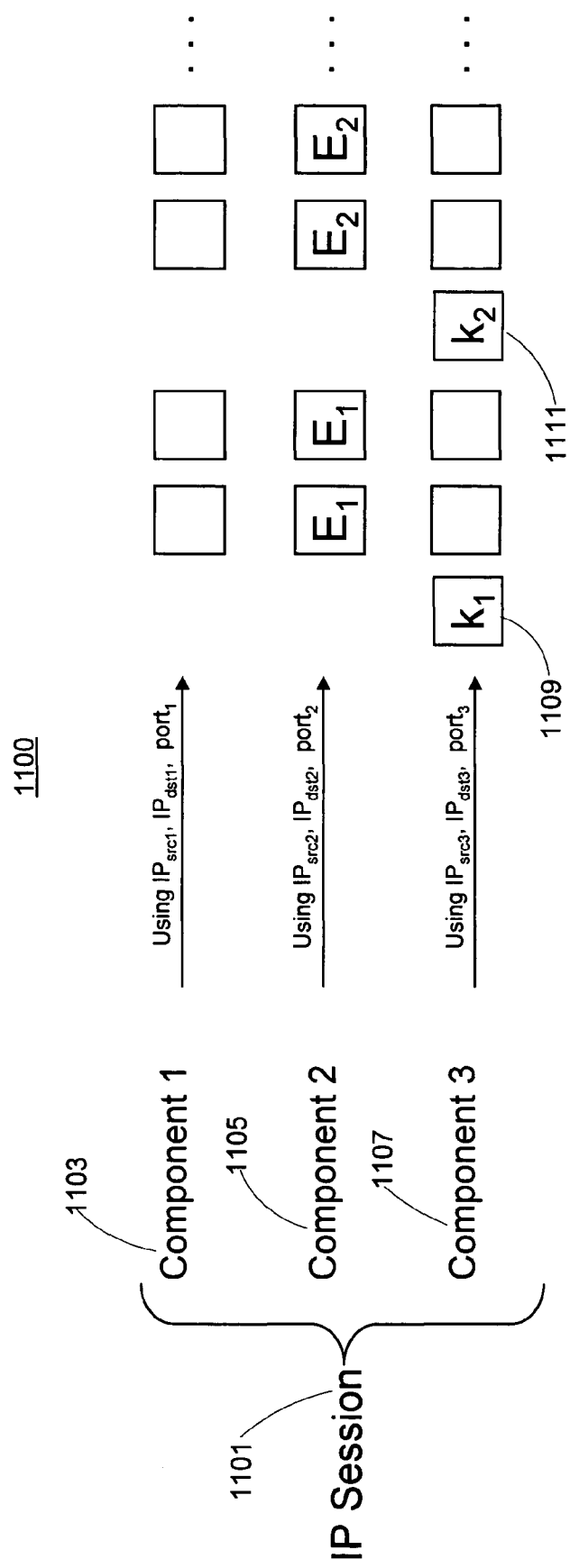
FIG. 11 shows a variation of the component configuration shown in FIG. 10 according to an embodiment of the invention.

FIG. 11 shows a variation of the component configuration shown in FIG. 10 according to an embodiment of the invention. With component configuration 1100, component 1107 provides key $k_1$ (corresponding to datagram 1109) and key $k_2$ (corresponding to datagram 1111) that are applied to component 1105 during multi-media session 1101. In the example shown in FIG. 11, components 1103 and 1107 are not encrypted with the keys provided by component 1107.

Figure 12:
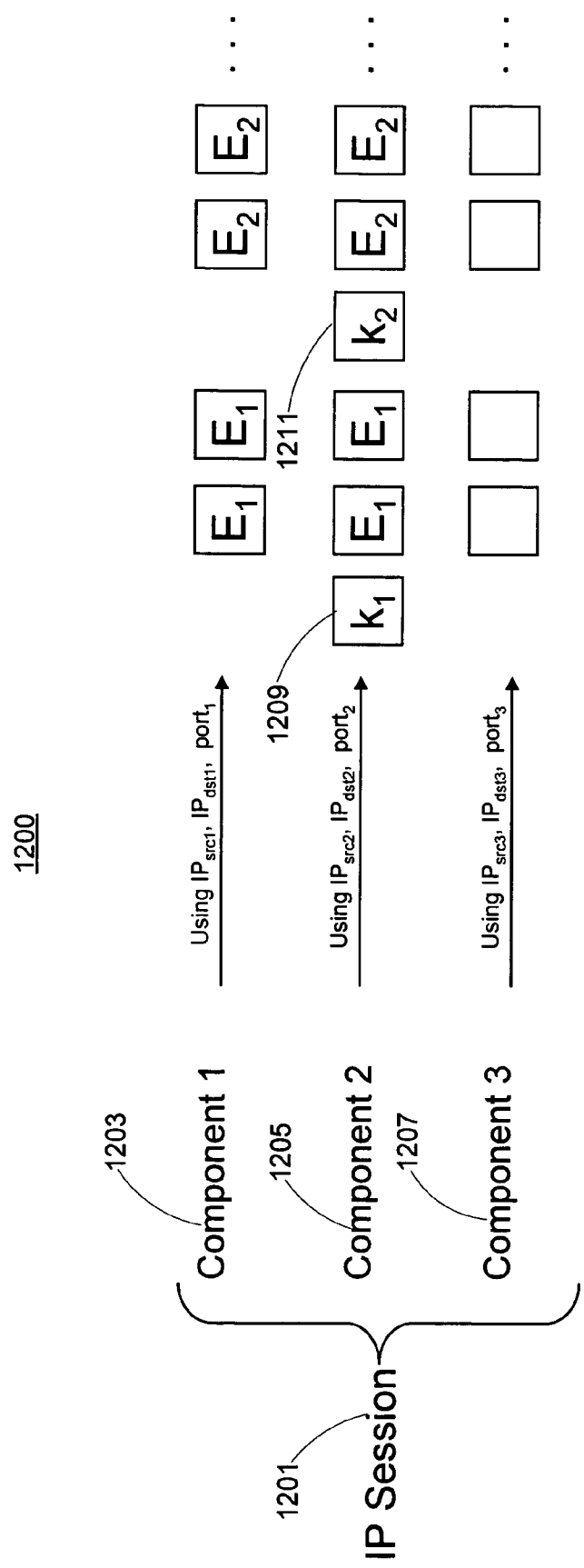
FIG. 12 shows a variation of the component configuration shown in FIG. 10 according to an embodiment of the invention.

FIG. 12 shows a variation of the component configuration shown in FIG. 10 according to an embodiment of the invention. Component configuration 1200 is similar to component configuration 1100. However, keys are applied to both the component carrying key information (component 1205) as well another component (component 1203) during multimedia session 1201. However, in the example shown in FIG. 12, component 1207 is not encrypted.

Figure 13:
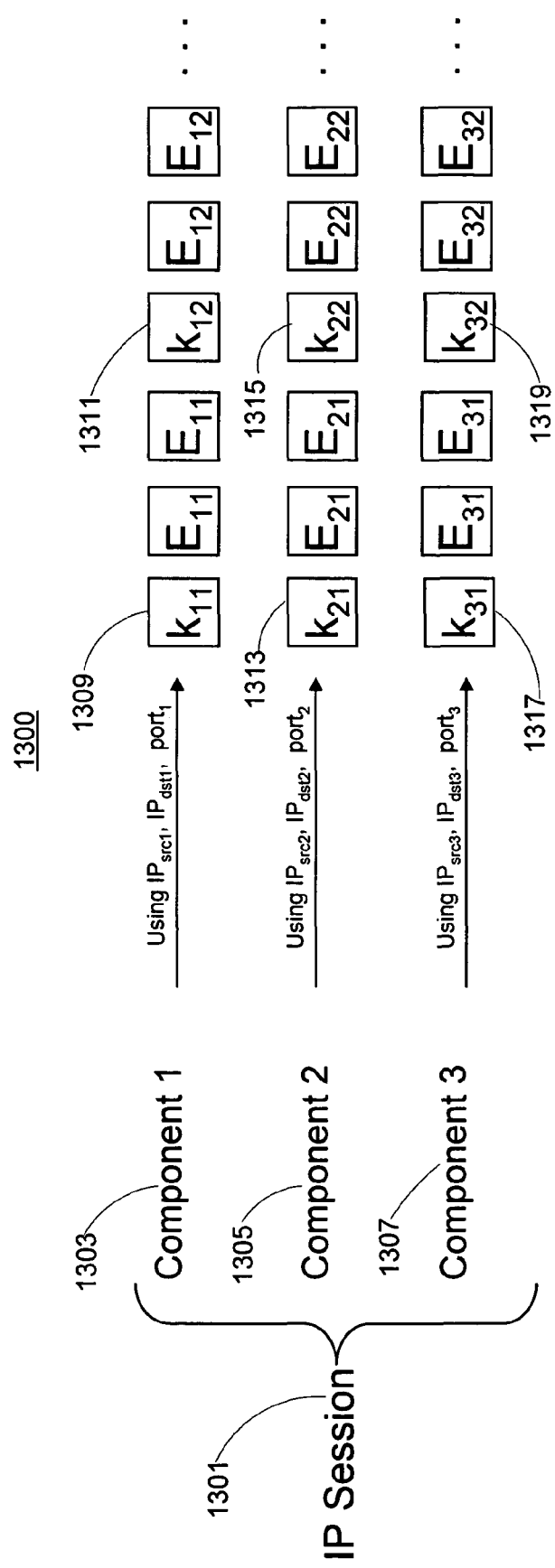
FIG. 13 shows a variation of the component configuration shown in FIG. 10 according to an embodiment of the invention.

FIG. 13 shows a variation of the component configuration shown in FIG. 10 according to an embodiment of the invention. With component configuration 1300, each component 1303, 1305, and 1307 carries keys that are applied to the same component during multi-media session 1301. For example, keys $k_{11}$ (corresponding to datagram 1309) and $k_{12}$ (corresponding to datagram 1311) are applied to component 1303. Keys $k_{21}$ (corresponding to datagram 1313) and $k_{22}$ (corresponding to datagram 1315) are applied to component 1305. Keys $k_{31}$ (corresponding to datagram 1317) and $k_{32}$ (corresponding to datagram 1319) are applied to component 1307.

Figure 14:
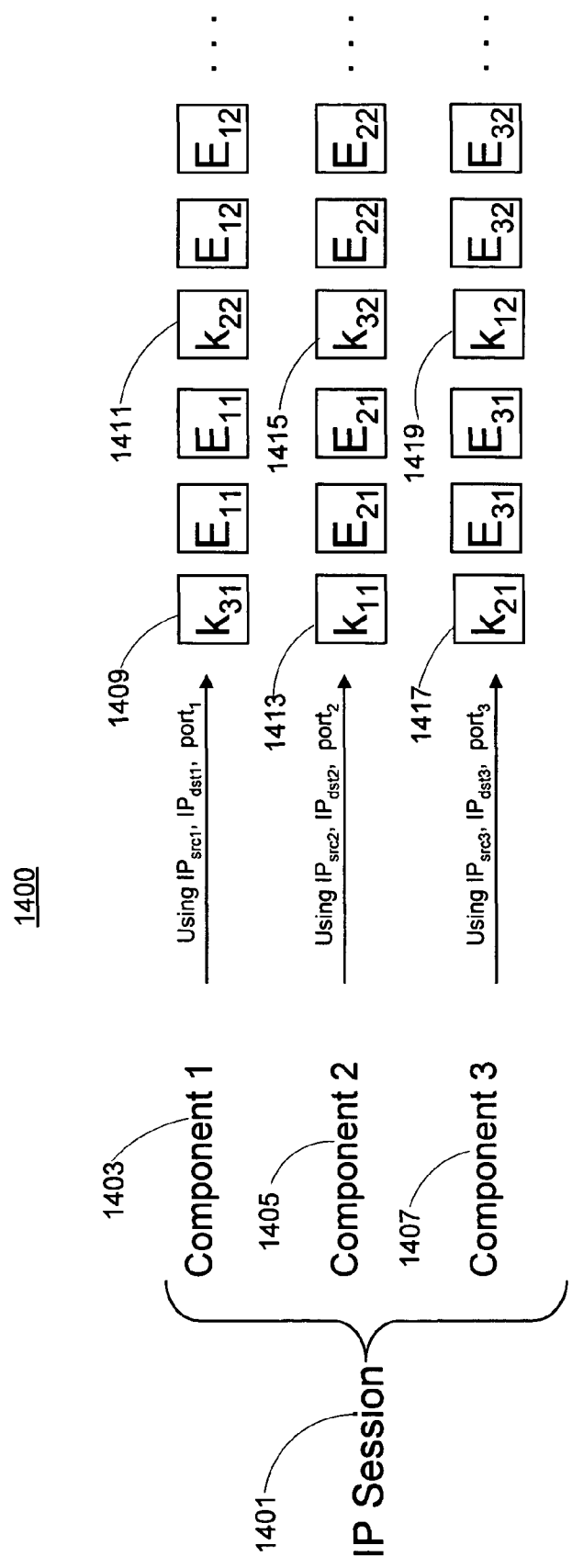
FIG. 14 shows a variation of the component configuration shown in FIG. 10 according to an embodiment of the invention.

FIG. 14 shows a variation of the component configuration shown in FIG. 10 according to an embodiment of the invention. With component configuration 1400, each component 1403, 1405, and 1407 carries keys that are applied to a different component during multi-media session 1401. For example, keys $k_{11}$ (corresponding to datagram 1413 and carried by component 1405) and $k_{12}$ (corresponding to datagram 1419 and carried by component 1407) are applied to component 1403. Keys $k_{21}$ (corresponding to datagram 1417 and carried by component 1407) and $k_{22}$ (corresponding to datagram 1411 and carried by component 1403) are applied to component 1405. Keys $k_{31}$ (corresponding to datagram 1409 and carried by component 1403) and $k_{32}$ (corresponding to datagram 1415 and carried by component 1405) are applied to component 1407.

Figure 15:
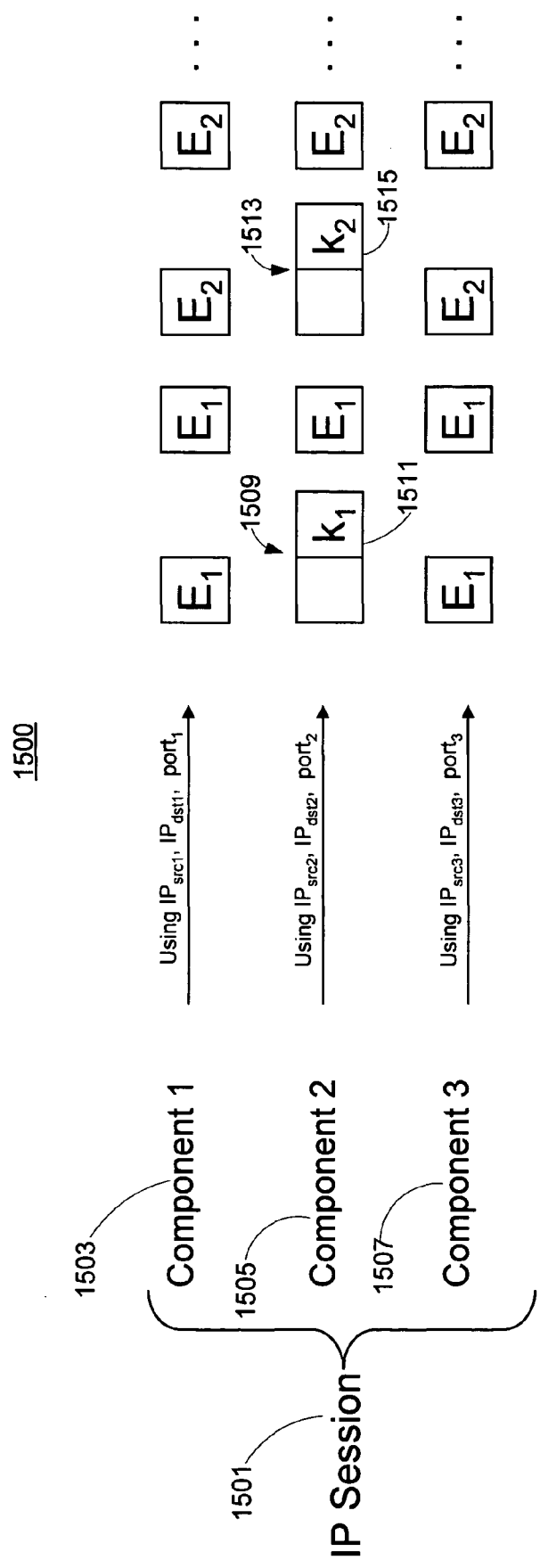
FIG. 15 shows a variation of the component configuration shown in FIG. 10 according to an embodiment of the invention.

FIG. 15 shows a variation of the component configuration shown in FIG. 10 according to an embodiment of the invention. With component configuration 1500, key information is carried in a content datagram rather than in a separate datagram. For example, key $k_1$ is included in content datagram 1509 within a concatenated portion (or with a special header) 1511 and $k_2$ is included in content datagram 1513 within a concatenated portion (or with a special header) 1515. Keys $k_1$ and $k_2$ are applied to datagrams in components 1503, 1505, and 1507.

Figure 16:
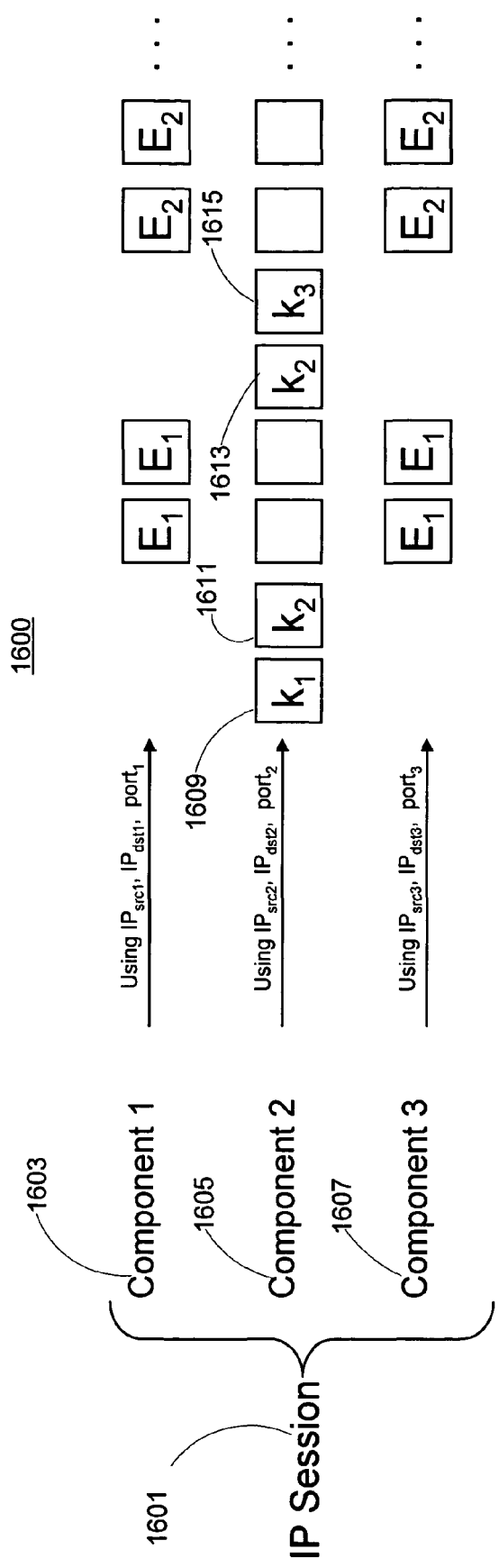
FIG. 16 shows a variation of the component configuration shown in FIG. 10 according to an embodiment of the invention.

FIG. 16 shows a variation of the component configuration shown in FIG. 10 according to an embodiment of the invention. Component configuration 1600 is similar to component configuration 800, in which both the current key as well as subsequent keys are provided. For example, component 1605 carries key $k_1$ (corresponding to datagram 1609) and key $k_2$ (corresponding to datagram 1611), where key $k_1$ is currently applied to components 1603 and 1607 and key $k_2$ is subsequently applied during multi-media session 1601. Similarly, key $k_2$ (corresponding to datagram 1613) and key $k_3$ (corresponding to datagram 1615) are subsequently carried in component 1605. As with component configuration 800, component configuration 1600 assists the receiver device to smoothen key transitions.

Figure 17:
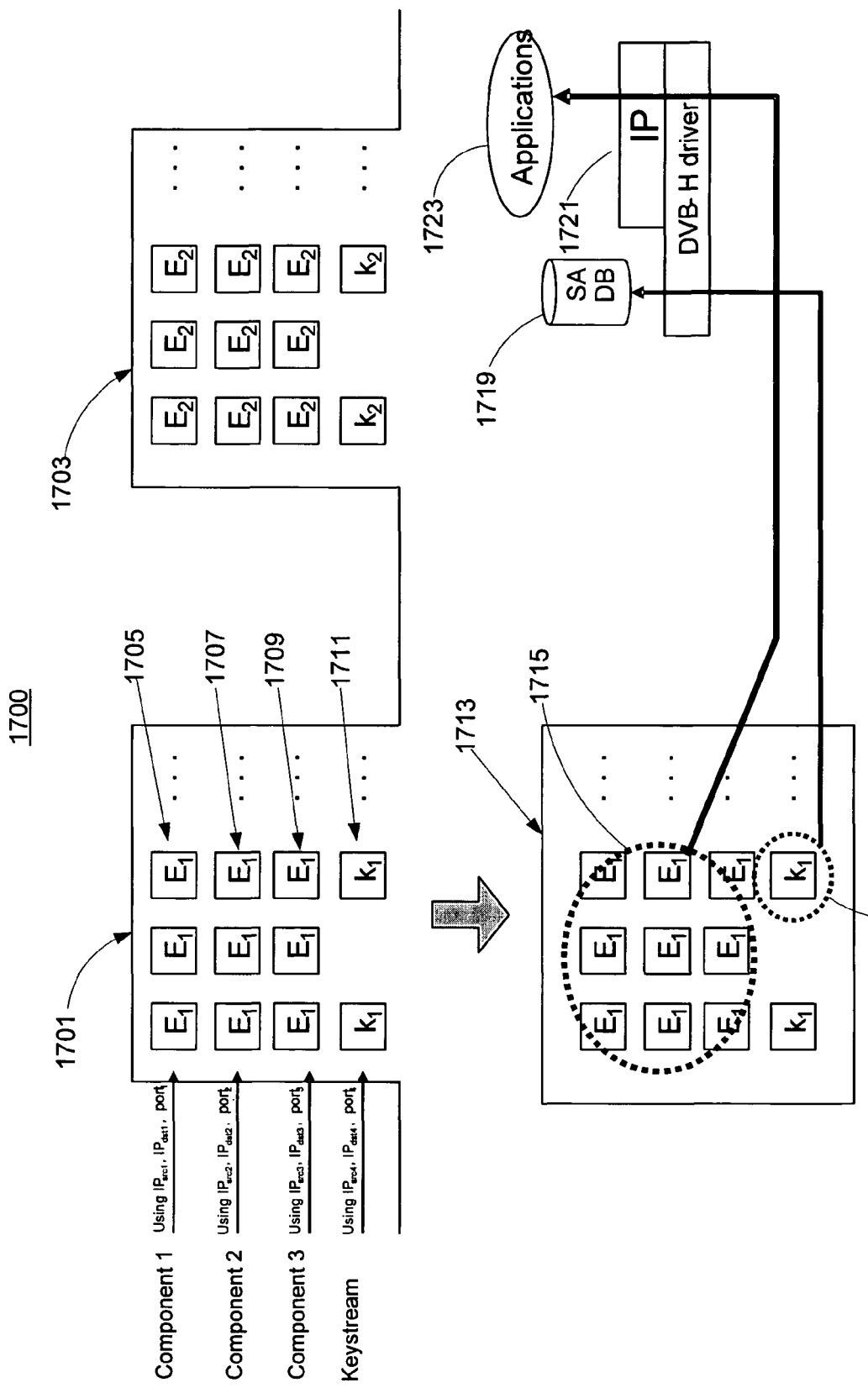
FIG. 17 shows a procedure for receiving a multi-media session in accordance with an embodiment of the invention.

FIG. 17 shows an architecture 1700 for receiving a multimedia session in accordance with an embodiment of the invention. With architecture 1700, a receiving device receives time slice burst of data 1701 containing both the IP session components and the keystream related to the session components. Pluralities of content datagrams 1705, 1707, and 1709 correspond to component 1, component 2, and component 3, respectively. A plurality of datagrams 1711 corresponds to the keystream. Time slice burst 1701 is stored in interim buffer 1713 before forwarding the datagrams (packets) to IP stack 1721. The receiving device first extracts the keys (corresponding to datagram 1717) for the received time slice burst 1701 from interim buffer 1713. Second, the receiving device installs the extracted keys to IPSec Security Association (SA) database 1719. Also, the receiving device extracts remaining datagrams 1715 from the interim buffer and forwards them to IP stack 1721. After decryption, the processed datagrams are passed to applications 1723 for the presentation of the multimedia content. Consequently, IP stack 1721 does not reject the content datagrams (unless there are content datagrams that the receiving device did not have a corresponding key as delivered in the current time slice or a previous time slice burst). The process is repeated for a next received time slice burst 1703.

Figure 18:
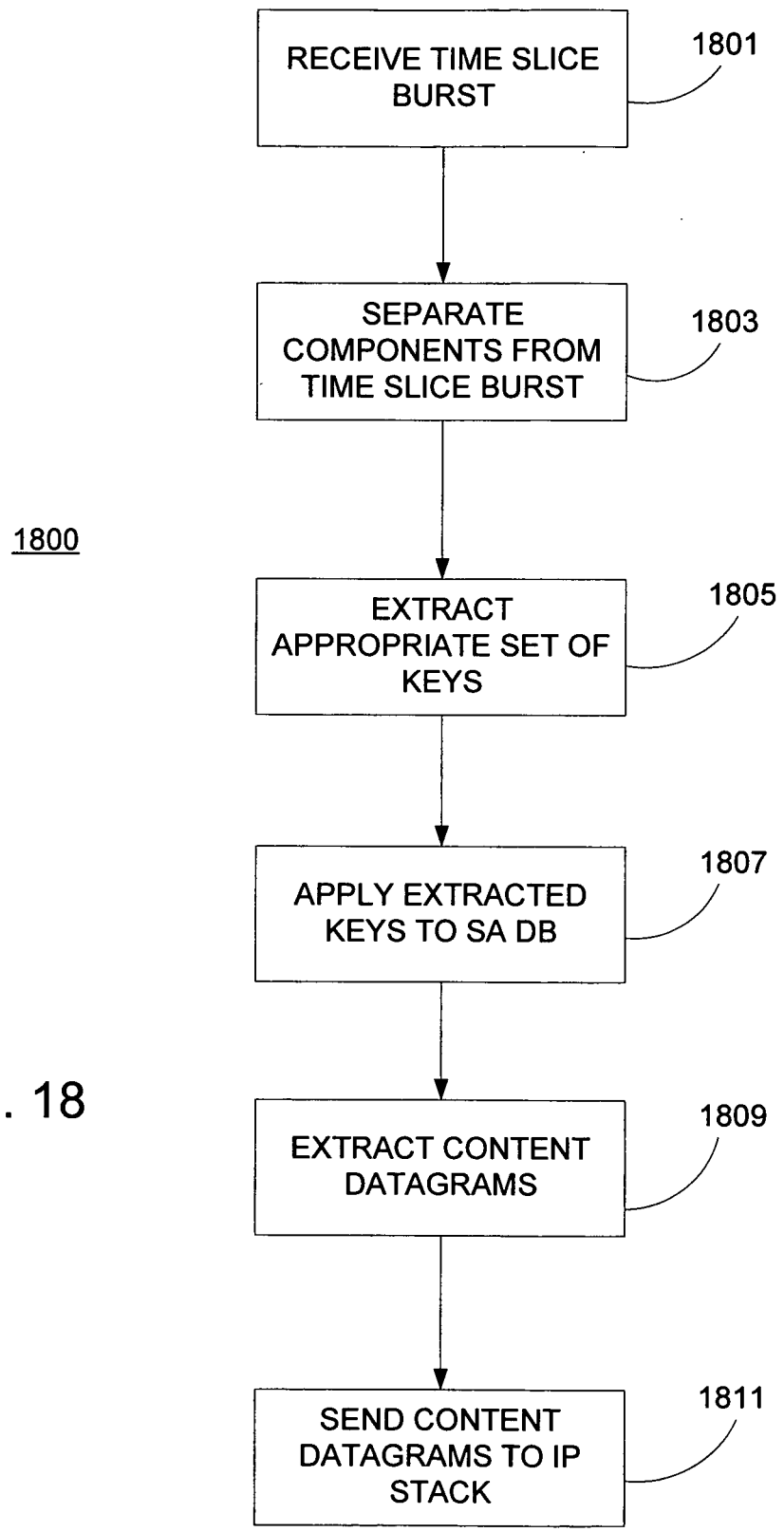
FIG. 18 shows a flow diagram for the architecture shown in FIG. 17 in accordance with an embodiment of the invention.

FIG. 18 shows flow diagram 1800 for the architecture shown in FIG. 17 in accordance with an embodiment of the invention. In step 1801, a receiving device receives a time slice burst over a communications channel, e.g., a wireless channel. In step 1803, the receiving device separates components (e.g., an audio component and a video component) from the received time slice burst. In step 1805, the receiving device extracts the associated set of keys from the keystream. The extracted keys may be applied to content datagrams contained in the time slice burst or in subsequent time slice bursts. Also, the embodiment supports configurations in which different keys are used for different datagrams in the time slice burst. The extracted keys are applied to an IPSec Security Association (SA) database (e.g., SA DB 1719 shown in FIG. 17) in step 1807. In step 1809, the content datagrams are extracted from a buffer (e.g., interim buffer 1713) and sent to an IP stack (e.g., stack 1721) in step 1811. The content datagrams are subsequently decrypted and sent to the corresponding application.

Figure 19:
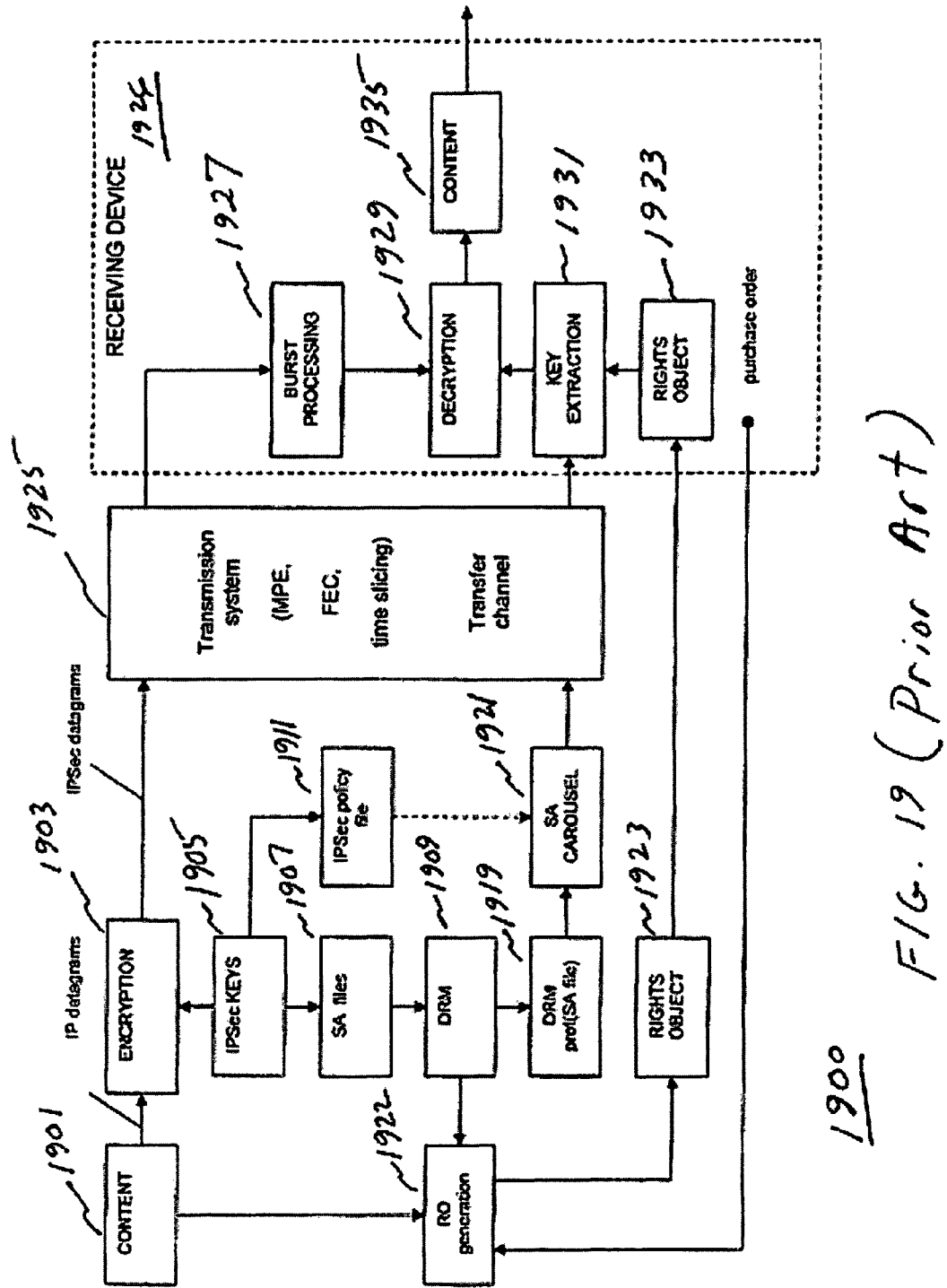
FIG. 19 shows a system for protected content transfer that supports DVB-H IPDC (IP datacast) services according to prior art.

FIG. 19 shows a system 1900 for protected content transfer that supports DVB-H IPDC (IP datacast) services according to prior art. System 1900 provides protected content transfer for DVB-H services using IPDC as specified in "Interim DVB-H IP Datacast Specifications: IP Datacast Baseline Specification: Specification of Interface I_MT", DVB Document A080, April 2004. In accordance with this specification, portions of security associated data are transmitted in an electronic service directory (ESG) in SA carousel 1921 as DRM protected SA file 1919 (which is provided by digital rights manager (DRM) 1909 by performing the protection function) and IPSec policy file 1911. As the carousel data is typically updated infrequently (e.g., once a day) system 1900 does not provide an efficient solution for key delivery, especially if one or more of the keys is updated or frequently changes.

Multi-media content 1901 (corresponding to IP datagrams) is encrypted by encryption module 1903 with IPSec keys 1905 and transmitted (as performed by transmission system 1925) as time slice packets (after multi-protocol encapsulation, FEC encoding, and time slice burst formation) to receiving device 1926. Rights object (RO) 1923 (which is provided by rights object generation 1922) is transmitted to receiving device 1926 through an interaction channel, in which receiving device 1926 is provided with a means for bidirectional communications, e.g., mobile phone functionality. A user of receiving device 1926 may order service (content) and consequently receive the corresponding rights object (RO) 1933, which allows the user to decrypt the content of the ordered service. In the embodiment, rights object 1933 typically does not contain IPSec keys 1905.

Receiving device 1926 processes time slice bursts with burst processing module 1927. Received packets are decrypted by decryption module 1929 with a key provided by key extraction module 1931 in order to obtain content 1935. The keys are determined from rights object 1933. The keys are typically delivered in a SA carousel as DRM protected SA files. Rights object 1933 allows receiving device 1926 to extract the keys.

Figure 20:
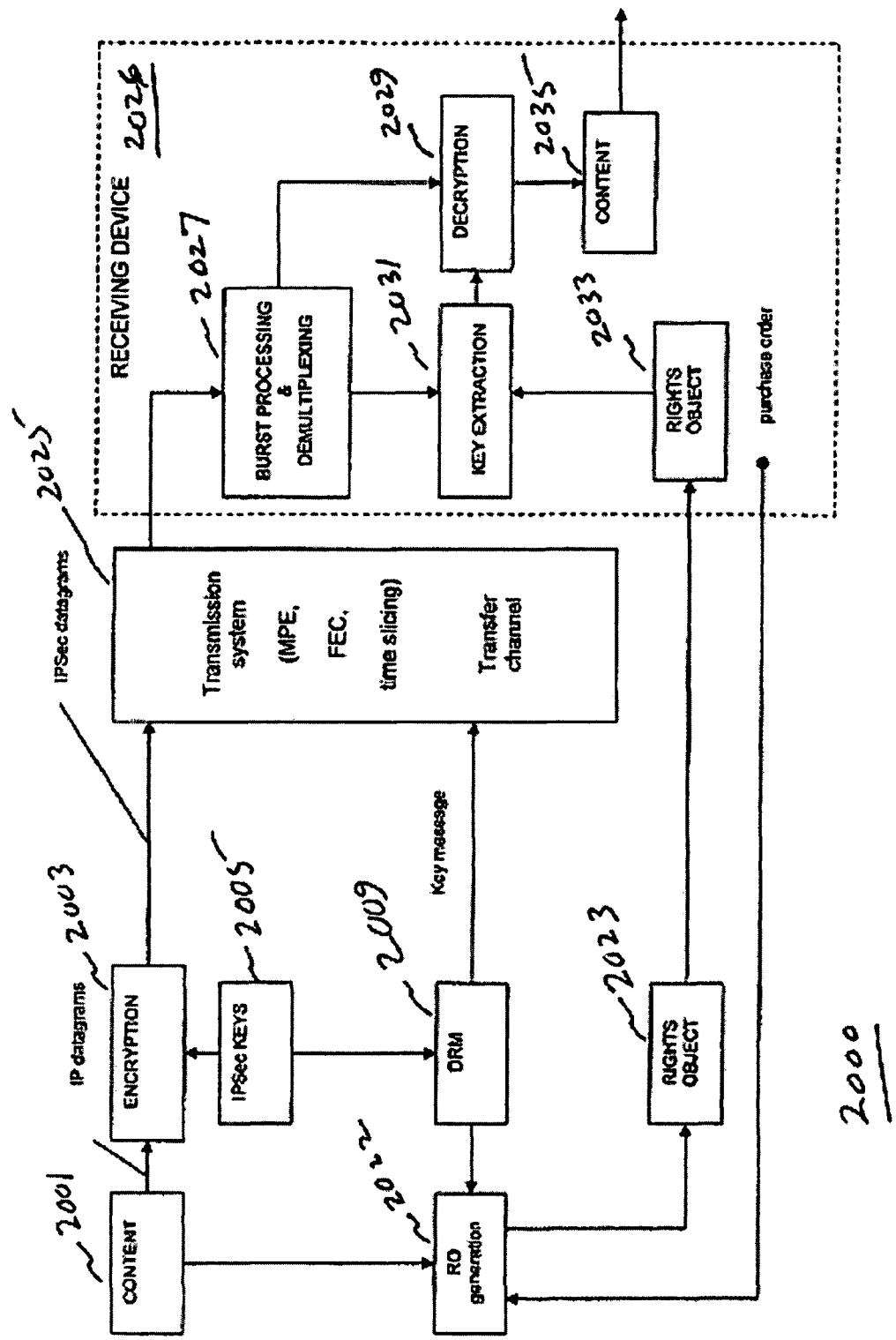
FIG. 20 shows a system that supports DVB-H IPDC services in accordance with an embodiment of the invention.

FIG. 20 shows a system 2000 that supports DVB-H IPDC services in accordance with an embodiment of the invention. Multi-media content 2001 (corresponding to content datagrams) is encrypted by encryption module 2003 by applying IPSec keys 2005. Transmission system 2025 obtains both encrypted content datagrams from encryption module 2003 and the corresponding keys from DRM 2009. Transmission system 2025 forms corresponding datagrams that contain the keys corresponding to encrypting the content datagrams. Transmission system 2025 inserts both the encrypted content datagrams and the corresponding datagrams into a time slice burst, which is transmitted to receiving device 2026 over a communications channel. While FIG. 20 does not explicitly show a radio module, the embodiment may provide wireless signal capability in order to transmit the time slice burst to receiving device 2026 over a wireless channel.

Receiving device 2026 processes a received time slice burst, in which the encrypted content datagrams and corresponding datagrams (containing the corresponding keys that are used for encrypting the received content datagrams) are separated (demultiplexed) by burst processing module 2027. In the embodiment, receiving device 2026 comprises a broadband receiver for receiving DVB signals that include time slice bursts and a transceiver for bidirectional communications in a wireless network. The bidirectional communications supports service ordering by a user, OMA messaging, and security plug-in module installation. The embodiment supports different signal configurations, in which the keys are included in a separate keystream or in which keys are included in multi-media components as previously discussed with FIGS. 4-16. Key extraction module 2031 extracts the keys from the corresponding datagrams in order to decrypt the content datagrams, as performed by decryption module 2029. Decryption module provides decrypted content 2035 to an application (not shown) so that the content can be presented.

Additionally, rights management object 2023 (as determined by rights object generator 2022) is separately transmitted to receiving device 2026 in response to a purchase order. Consequently, receiving device 2026 receives rights object 2033 to determine if receiving device 2026 is permitted to process the received content.

Figure 21:
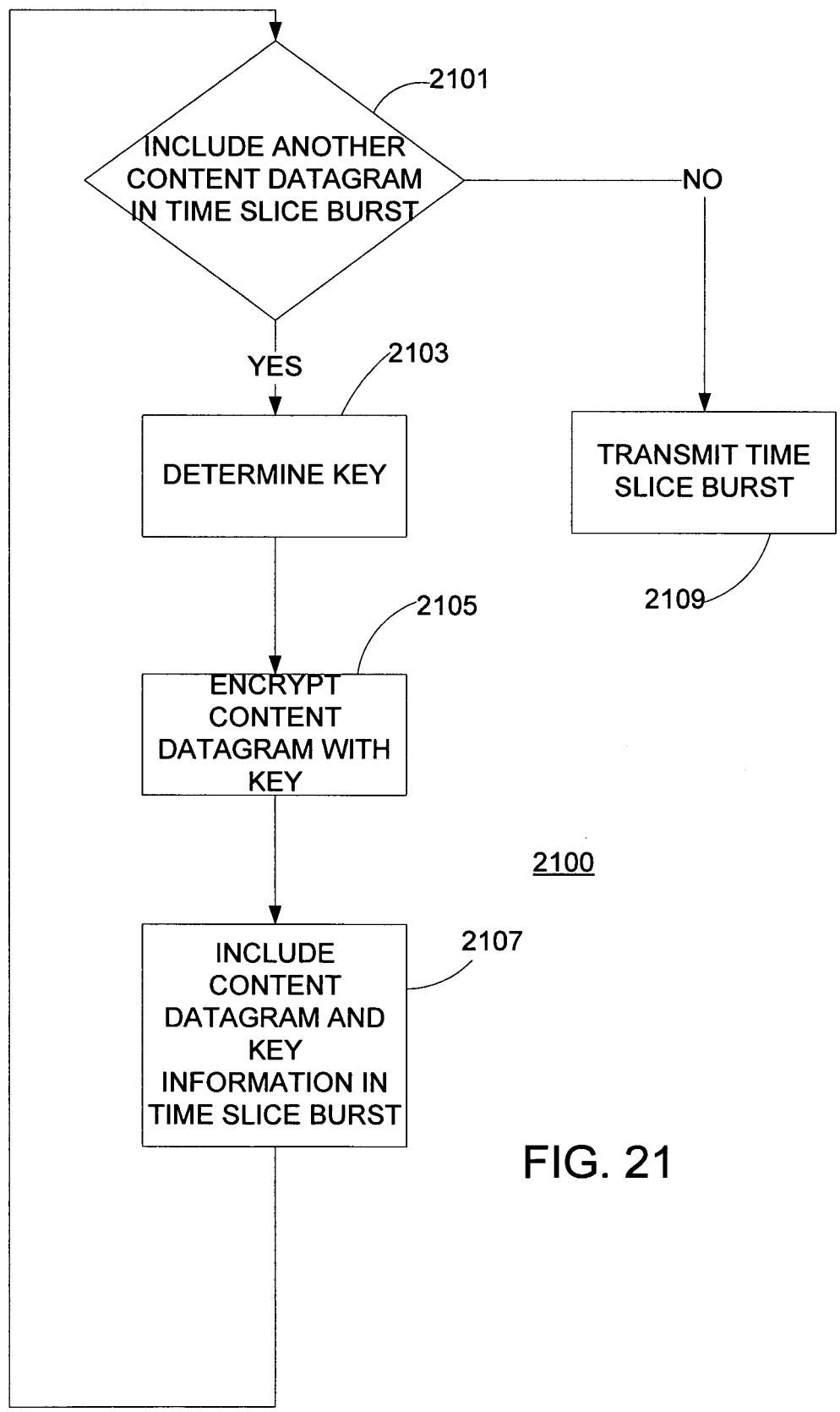
FIG. 21 show a flow diagram for transmitting data for DVB-H IPDC services in the system shown in FIG. 20 in accordance with an embodiment of the invention.

FIG. 21 show a flow diagram 2100 for transmitting data for DVB-H IPDC services in system 2000 in accordance with an embodiment of the invention. In step 2101, transmitting apparatus (e.g., transmission system 2025) determines if an obtained content datagram should be included in the current time slice burst. If not, the time slice burst (with previously obtained content datagrams and associated keys) is sent to the receiving device in step 2109.

If the obtained content datagram should be included in the current time slice burst, step 2103 determines the corresponding key and encrypts the content datagram with the key in step 2105. In step 2107 the encrypted content datagram and the corresponding key information (corresponding to a corresponding datagram that may be included in multi-media component or in a keystream) is inserted in the current time slice burst.

Figure 22:
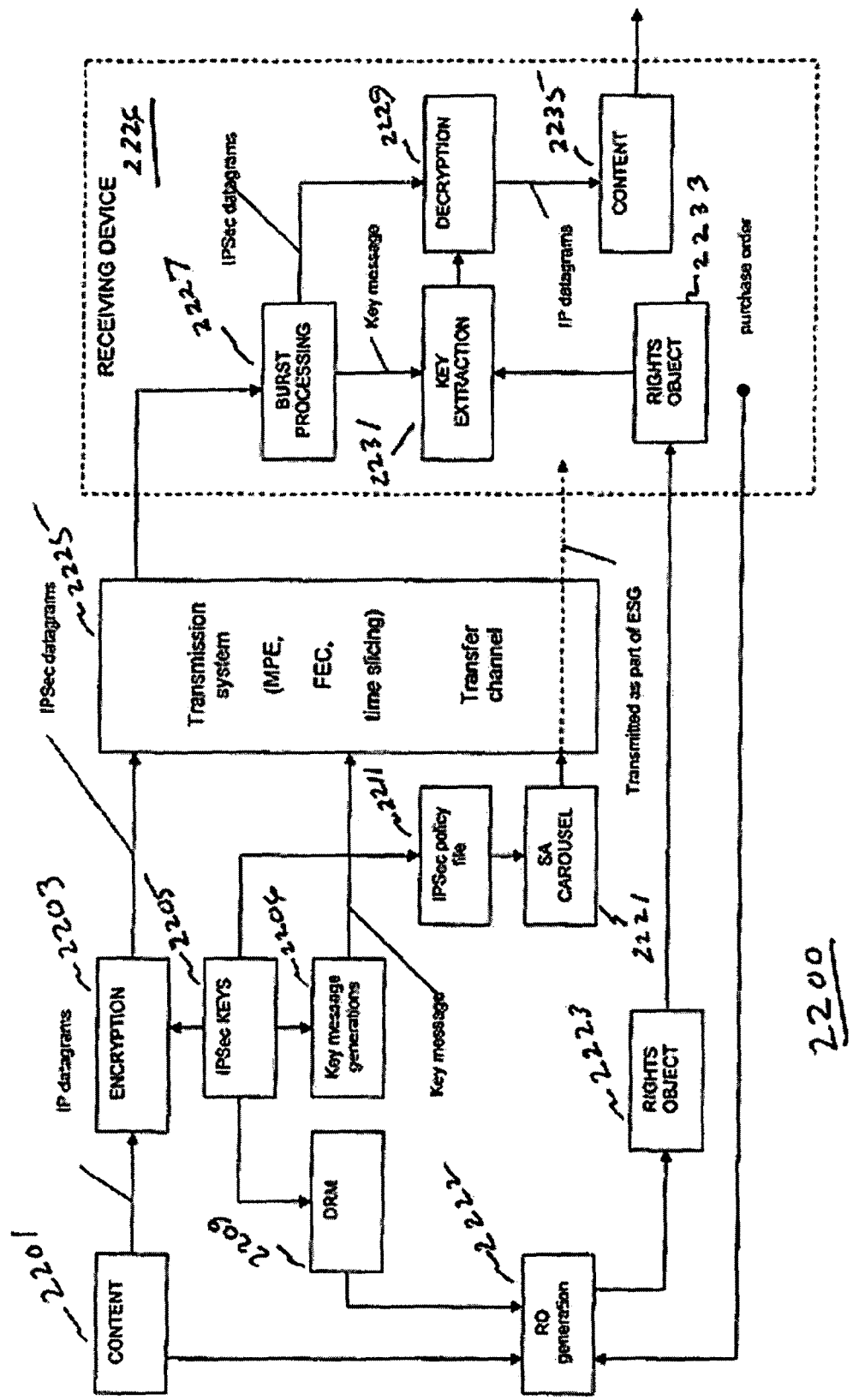
FIG. 22 shows a system that supports DVB-H IPDC services in accordance with an embodiment of the invention.

FIG. 22 shows a system 2200 that supports DVB-H IPDC services in accordance with an embodiment of the invention. In FIG. 22, elements 2201, 2203, 2205, 2222, 2223, 2227, 2229, 2231, 2233, and 2235 correspond to elements 2001, 2003, 2005, 2022, 2023, 2027, 2029, 2031, 2033, and 2035 as shown in FIG. 20. As with system 2000, system 2200 transmits content datagrams and corresponding key information in the same time slice burst. Key information is provided to transmission system 2225 by key message generator 2206. Key message generator may further encrypt the keys so that encrypted key information is transmitted to receiving device 2226 by transmission system 2225. DRM 2209, in conjunction with rights object generator 2222, provides rights object 2233 that corresponds to the desired DVB-H IPDC service to receiving device 2226.

IPSec policy files 2211 (that may contain security association information) are separately transmitted in SA carousel 2221 from the service (content) and key messages that are multiplexed and transmitted using IPDC time slicing. In the embodiment, SA carousel 2221 is transmitted as part of the electronic service guide (ESG).

Figure 23:
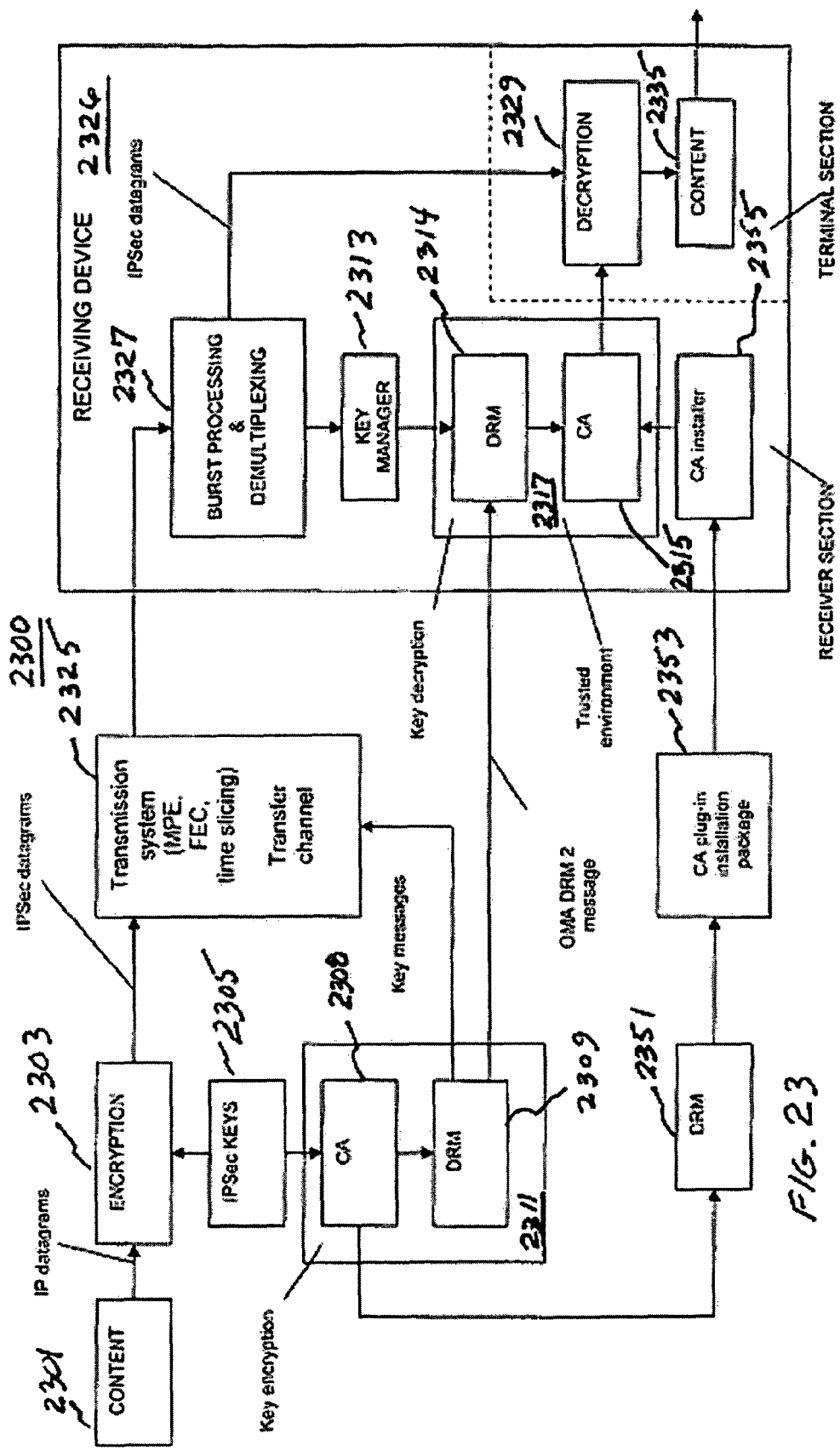
FIG. 23 shows a system that supports DVB-H IPDC services in accordance with an embodiment of the invention.

FIG. 23 shows a system 2300 that supports DVB-H IPDC services in accordance with an embodiment of the invention. System 2300 supports conditional access (CA) that can provide a second-level of encryption using a corresponding private key. (As will be discussed with FIG. 26, IPSec keys may be encrypted by digital rights management (DRM) as well as by a CA module.) Receiving device 2326 comprises a receiver section and a terminal section. The receiver section performs burst processing, demultiplexing, and key management. The receiver section also includes CA plug-in installation and key decryption. DRM 2351 sends CA plug-in installation package 2353 to DRM 2314 so that a new CA plug-in module is installed at receiving device 2326 as will be further discussed with FIG. 27. The key decryption is performed in a secure processing environment. The terminal section performs key management and key decryption in addition to the decryption (corresponding to decryption module 2329) and content rendering (corresponding to content 2335).

Encryption of keys 2305 (which are used to encrypt content 2301 by encryption module 2303) is performed by key encryption module 2311. Key encryption module 2311 comprises CA module 2308 and DRM 2309. Thus, key encryption module 2311 may provide two levels of encryption. Both the encrypted key information and the content datagrams are included in the same time slice burst by transmission system 2325.

Correspondingly, decryption of the received key information is performed by key decryption module 2317. Key decryption module 2317 comprises DRM 2314 and CA module 2315. Key decryption module 2317 performs two levels of decryption that correspond to the two levels of encryption. Burst processing module 2327 decrypts the received content datagrams using the decrypted keys provided by key manager 2313. Received content datagrams are decrypted by decryption module 2329 of the terminal section. Key manager 2313 receives the key information that is demultiplexed by module 2327 and forwards the key information to key decryption module 2317 (which is associated with a trusted environment) for DRM and CA decryption.

In the embodiment, the rights object (RO) is transmitted as an OMA DRM 2 message (according to the proposed Open Mobile Alliance Digital Rights Management Version 2.0) from DRM 2309 to DRM 2314. The rights object is typically transmitted separately from the time slice bursts.

Figure 24:
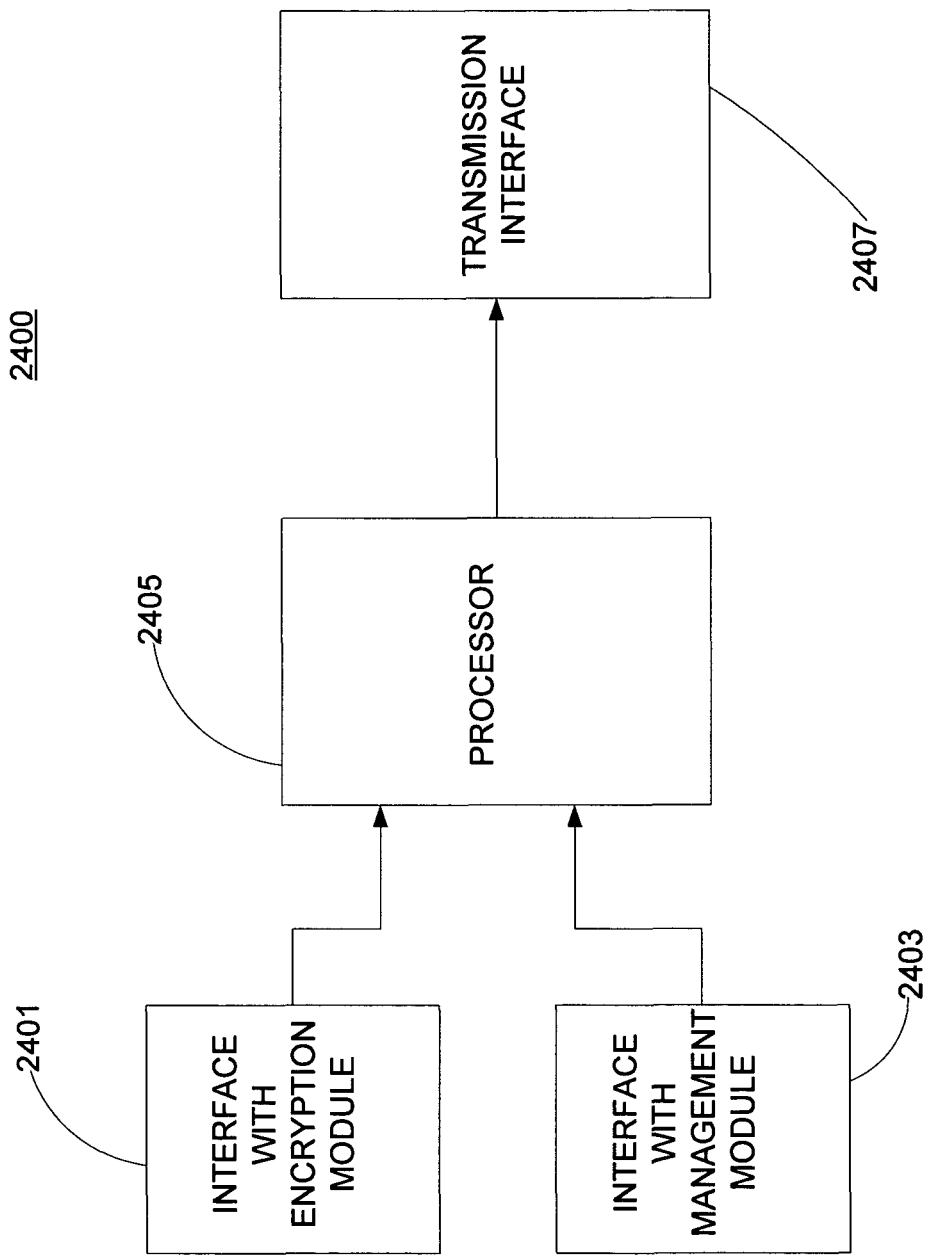
FIG. 24 shows an apparatus for that supports a transmission module as shown in FIGS. 20, 22, and 23 in accordance with an embodiment of the invention.

FIG. 24 shows apparatus 2400 that supports a transmission system (e.g., 2025, 2225, and 2325) as shown in FIGS. 20, 22, and 23 in accordance with an embodiment of the invention. In the embodiment, apparatus 2400 performs functions typically associated with a link layer (the second layer of the OSI protocol model). Processor 2405 obtains encrypted datagrams from an encryption module (not shown) through encryption interface 2401 and corresponding key information from a key generator (not shown) through key interface 2403. Transmission interface 2407 encodes the datagrams for forward error correction at the receiving device, performs multi-protocol encapsulation, and formats the time slice burst with the encoded datagrams. (In the embodiment, the datagrams include both content datagrams and corresponding datagrams containing the keys.)

Figure 25:
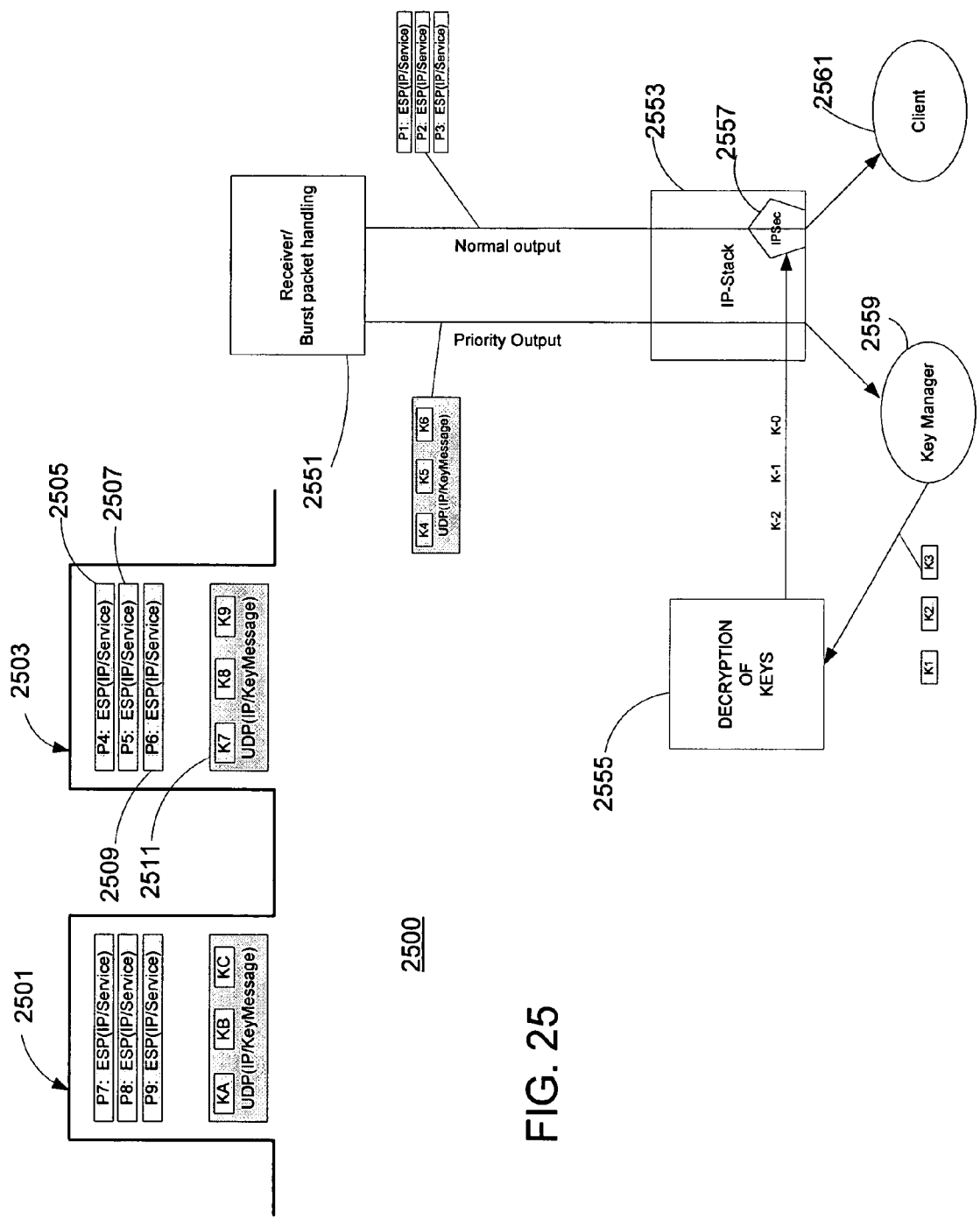
FIG. 25 shows an apparatus that receives a multi-media broadcast and that applies IPSec keys in accordance with an embodiment of the invention.

FIG. 25 shows apparatus 2500 for a receiving device (e.g., receiving devices 1926, 2026, 2226, and 2326 as shown in FIGS. 19, 20, 22, and 23, respectively) that receives a multimedia broadcast and that applies IPSec keys in accordance with an embodiment of the invention. Apparatus 2500 processes a time slice burst (e.g., time slice bursts 2501 and 2503) in order to extract the content datagrams and associated keystream. In the embodiment shown in FIG. 25, time slice burst 2501 or time slice burst 2503 has content datagrams (e.g., content datagrams 2505, 2507, and 2509) with ESP capsulated IP-packets containing service content and corresponding key datagrams (e.g., corresponding datagram 2511) comprising UDP key-messages. The keys in an UDP key-message may be protected with DRM.

Apparatus 2500 is capable of distinguishing between service content and key-messages. Consequently, receiver module 2551 separates content datagrams from key datagrams. In the embodiment, key datagrams are given a higher priority level than content datagrams by the transmitting apparatus (not shown). In the embodiment, the priority level associated with a datagram is indicated by a field, e.g., a type of service (ToS) field or a differentiated services field. Thus, key datagrams are sent to IP stack 2553 before corresponding content datagrams so that more time may be allotted for key processing by key decryption module 2555. Key decryption module is presented encrypted keys from IP stack 2553 through key manager 2559.

The embodiments shown in FIGS. 17 and 25 include the keys in the same time slice burst as the associated content datagram. However, in another embodiment, keys in a time slice burst are associated with decrypting content datagrams that are contained in the next time slice burst, thus allowing more time for key processing. Other variations are possible. For example, a number of keys for use in decrypting content may be provided in a single time slice burst and the keys may then be used for a plurality of subsequent time slice bursts.

The decrypted keys are presented to IPSec module 2557 so that the associated content datagrams in IP stack 2553 can be decrypted and presented to client 2561.

Figure 26:
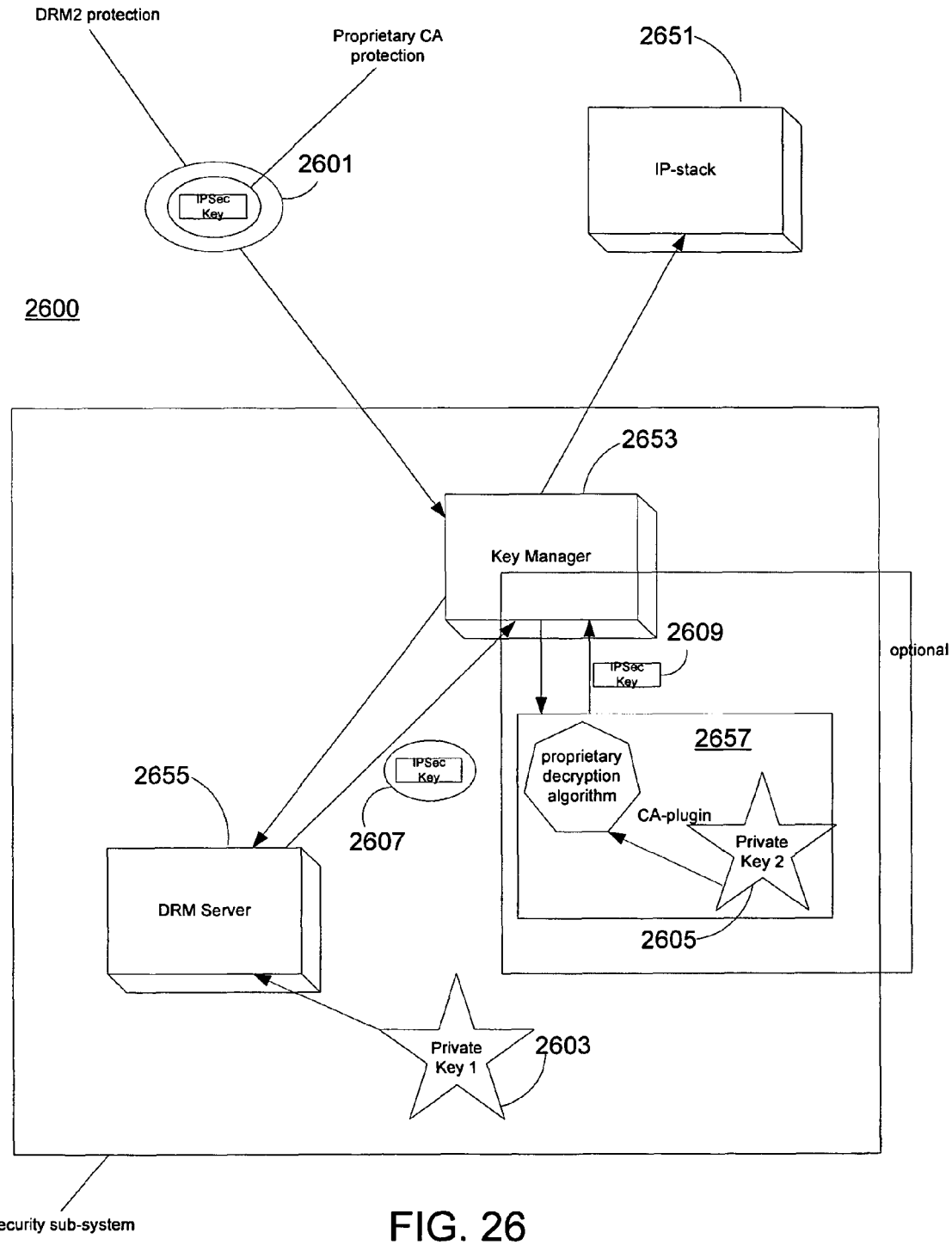
FIG. 26 shows an apparatus that receives a multi-media broadcast and that decrypts the IPSec keys in accordance with an embodiment of the invention.

FIG. 26 shows apparatus 2600 that receives a multi-media broadcast and that decrypts received IPSec keys 2601 in accordance with an embodiment of the invention. Key manager 2653 routes the encrypted IPSec key to DRM server 2655 to decrypt a second-level of encryption using a public decryption algorithm and private key 2603. DRM server 2655 returns second-level decrypted key 2607 to key manager 2653. If the key manager 2653 determines that the key is encrypted with a first-level of encryption, key manager 2653 routes the second-level decrypted key to CA plug-in software module 2657. CA plug-in module 2657 utilizes a secret decryption algorithm and private key 2605 to decrypt second-level decrypted key 2607. In an embodiment of the invention, the secret decryption algorithm corresponds to a DVB common scrambling algorithm (CSA), which is available from the European Telecommunications Standards Institute (ETSI). CA plug-in software module 2657 returns decrypted key 2609 to key manager 2653, which forwards decrypted key 2609 to IP stack 2651.

In the embodiment, CA plug-in module 2657 performs a first-level of decryption that is optional and that is based on an operator-specific CA-method that includes an associated private key and an associated decryption algorithm. The second-level of encryption is based on an open standard, e.g., OMA DRM2. Because the first-level of encryption is optional, key manager 2653 determines whether a first-level of encryption has been applied to second-level decrypted key 2607. If so, key manager 2653 routes second-level decrypted key 2607 to CA plug-in software module 2657. If not, key manager 2653 routes second-level decrypted key 2607 directly to IP stack 2651 because second-level decrypted key 2607 is completely decrypted.

In the embodiment, key manager 2653 determines whether second-level decrypted key 2607 has been first-level encrypted by examining an associated encryption indicator (not shown), e.g., a header or a message field. The associated encryption indicator indicates 'YES' if second-level decrypted key 2607 has been first-level encrypted and 'NO' if second-level decrypted key 2607 has not been first-level encrypted. If second-level decrypted key 2607 has been first-level encrypted, the associated encryption indicator is not first-level encrypted.

Figure 27:
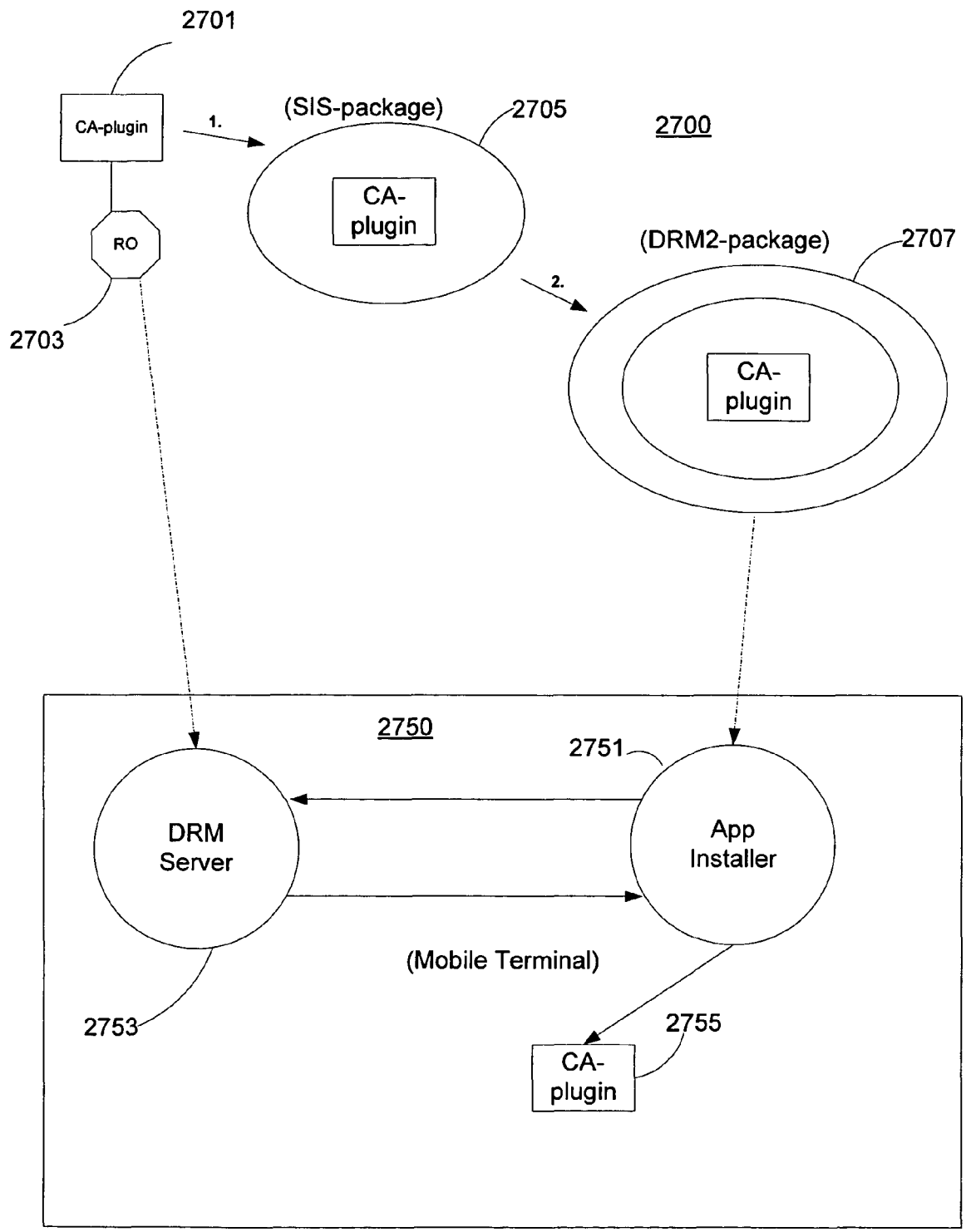
FIG. 27 shows a system for deploying a security plug-in software module in accordance with an embodiment of the invention.

FIG. 27 shows system 2700 for deploying a new security plug-in software module 2701 at receiving device 2750 in accordance with an embodiment of the invention. Security plug-in software module 2701 is formatted as an installation package 2705 (e.g., a SIS file as supported by Symbian). Installation package 2705 is protected (e.g., with OMA-DRM2) to form protected package 2707 and delivered to a receiving device using a delivery mechanism. The embodiment supports different communications channels in a delivery mechanism, including a wireless communications channel in which the receiving device is a wireless terminal. The received protected package 2707 is directed to application installer 2751, which is a trusted application. Application installer 2751 extracts new security plug-in software module 2701 from protected package 2707 and replaces current security plug-in software module 2755 that is currently installed at the receiving device 2750 with new security plug-in software module 2701. In order to extract new security plug-in software module 2701, receiving device 2750 receives rights object 2703 that is processed by DRM 2753. Consequently, DRM 2753 indicates to application installer 2751 that security plug-in software module replacement is permitted.

In embodiments of the invention, component configurations as shown in FIGS. 3-16 may be incorporated in systems as shown in FIGS. 20, 22, and 23.

Methods and Apparatus for Providing Fine Grain Usage Rights

While the above discussion provide details regarding embodiments of methods and apparatuses for use in providing streaming content that may be used with the methods and apparatus discussed below, other methods and apparatus may also be used.

Control of rights for streaming content is somewhat difficult because there is a limited amount of bandwidth available. A natural solution to the problem is to create and deliver in the normal way ROs with very short validity periods, possibly containing the same service key but with different usage rights. This may be cumbersome in practice though, as service keys change much less frequently than, for example, television programs on a television channel. As another solution, ROs or just right expressions could be delivered in KSMs. Sending complete ROs frequently in the KSM would consume quite a bit of bandwidth however, as they must be addressed to each subscriber (or a group of subscribers) individually, so that only those who have paid get the rights. Even if the rights are the same to all subscribers, and access to the KSM is limited by other means so that the KSM needs to contain only the rights expression part of a RO, the rights expression itself may require a considerable number of bits, particularly if an XML-type Rights Expression Language is used. Typical solutions to this problem involve various compression methods to binarize the rights expression, or to limit the possible rights to a few predetermined cases ("usage states"). However, these potential solutions fail to adequately provide RIs with a sufficiently fine grain control in a bandwidth friendly manner so as to be practical for adoption.

Figure 28:
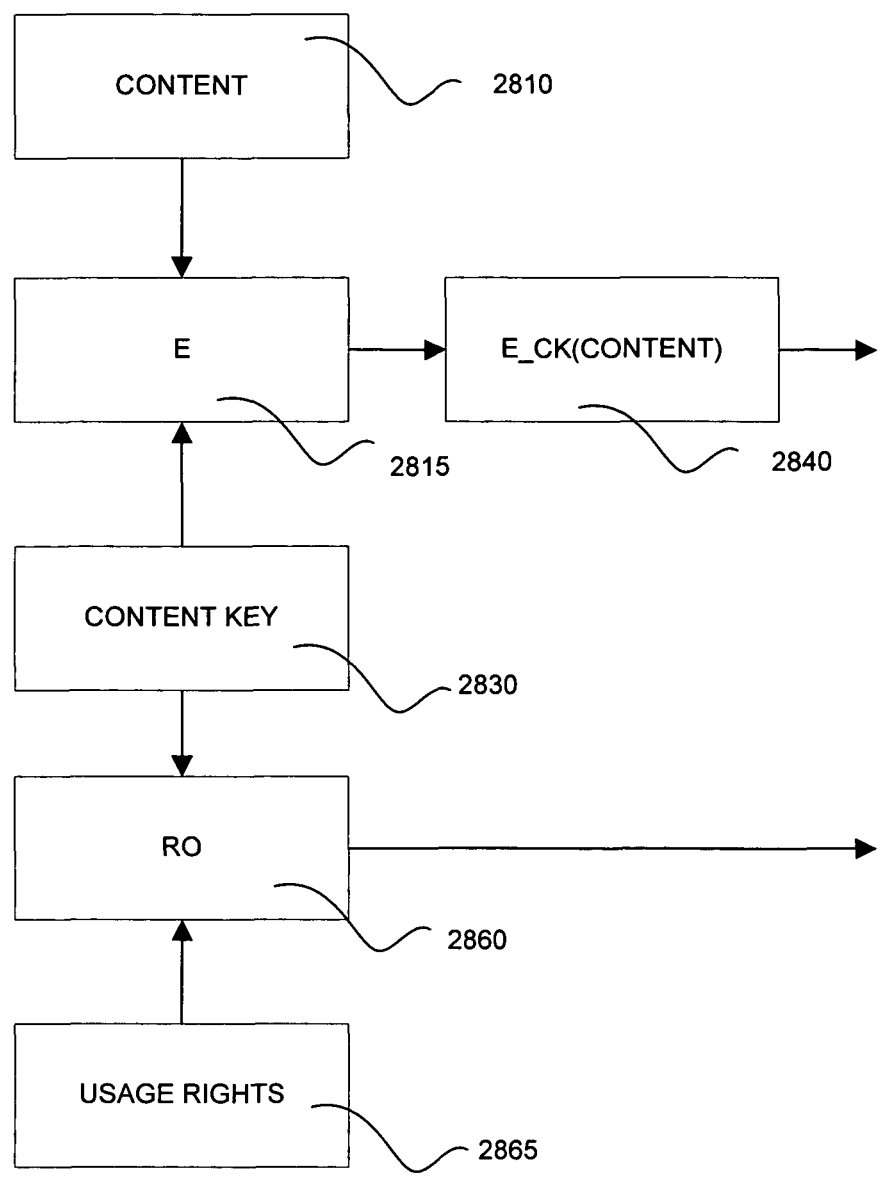
FIG. 28 shows and example of a prior art method of providing encrypted content.

Looking first at FIG. 28, an example of the prior art is provided. The content is encrypted (E) with a content key (CK) and provided to a receiver (not shown). The receiver separately obtains a RO 2860 that includes the CK along with a set of usage rights. The received encrypted content may then be viewed or otherwise used as provided for in the RO according to the usage rights obtained. However, this prior art method is not particularly suitable to streaming content.

Figure 29:
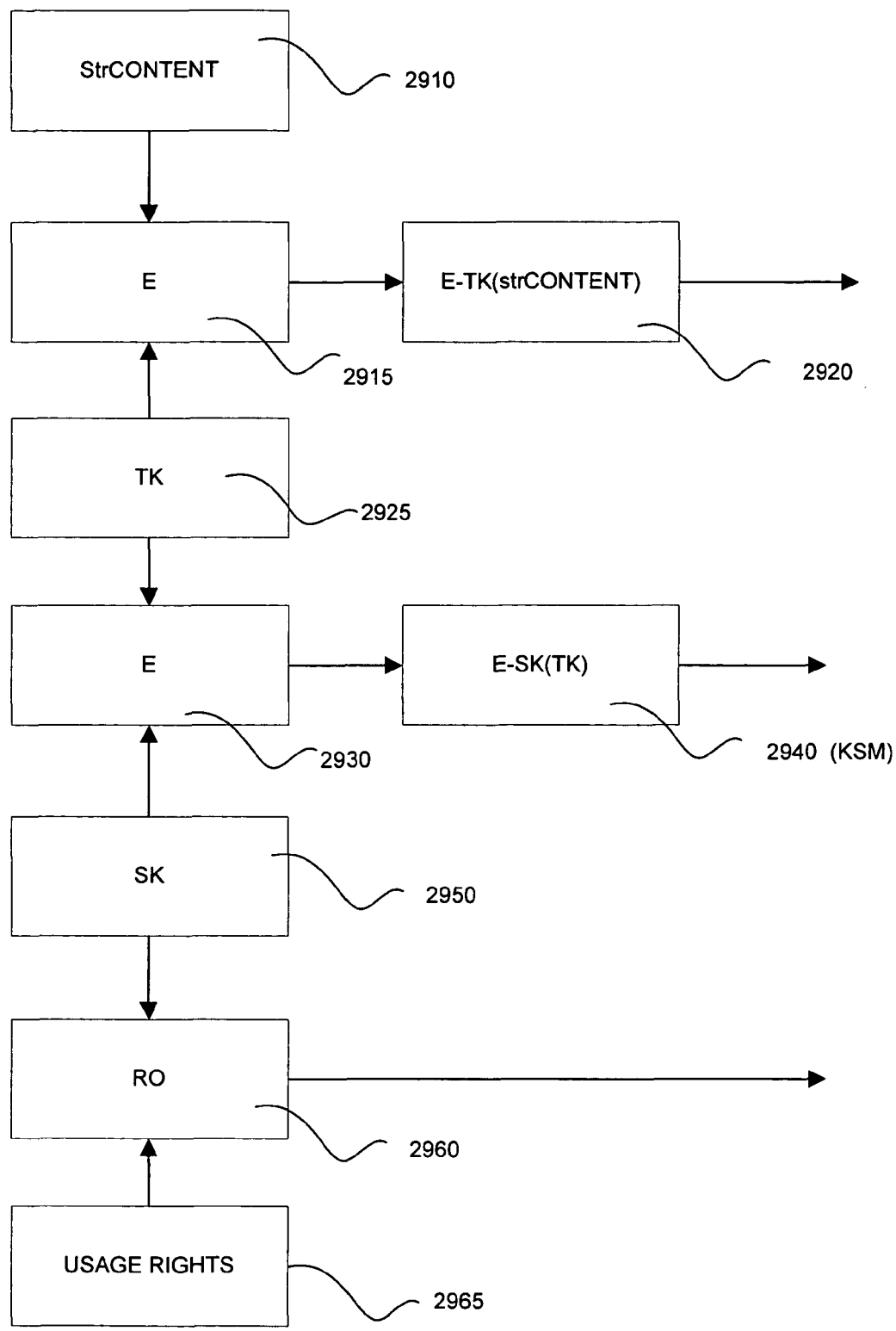
FIG. 29 shows a method of providing encrypted streaming content in accordance with an embodiment of the invention.

Turning to FIG. 29, an illustrative aspect of the present invention is shown. Streaming content 2910 is provided to a broadcaster and is encrypted in encryption 2915 using TK 2925. The receiver (not shown) is provided with the TK 2925 via a KSM 2940, the KSM 2940 being formed by encryption 2930 using the SK 2950 along with TK 2925. The keystream, which provides the KSM, is announced to the users with IP address and port number. As the TK 2925 is encrypted with SK 2950, the device uses RO 2960, which contains the SK 2950, to decrypt the KSM 2940 so as to be able to decrypt the streaming content 2910. In addition to providing the SK 2950, the RO 2960 also provides usage rights 2965.

Figure 31:
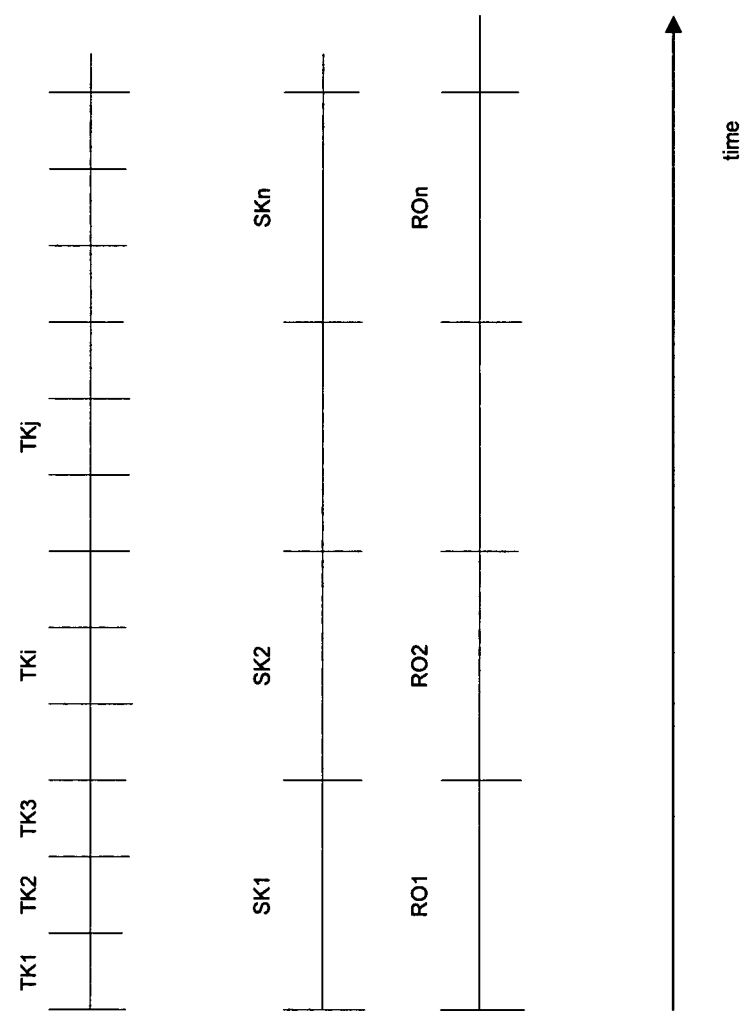
FIG. 31 shows a timeline of changes to traffic keys in accordance with an embodiment of the invention.

Typically, the TK will periodically change. FIG. 31 provides an example of this. As noted, the TK changes several times while the SK is valid. In practice, the number of changes in the TK may be much higher. When the TK changes, a new KSM 2940 (FIG. 29) is provided to the receiver with the new TK encrypted by the same SK 2950. Thus, while the SK 2950 remains the same, the RO 2960 will allow the receiver to decrypt the streaming content. When the SK changes, however, a new RO is needed so that the KSMs sent to the device may be decrypted and the streaming content used as permitted. Generally, ROs purchased from RIs must have relatively long validity periods to make the DRM mechanism feasible. In an embodiment, once a parent RO is obtained, the child ROs may also be obtained. As discussed above with reference to keys in FIGS. 4-16, in one embodiment of the invention the TKs are delivered in the KSM prior to their validity period so that the user (device) may decrypt the key(s) and bit combination before the actual streaming content (or segment of it) is received. Likewise, the RO may be acquired prior to the validity period.

As noted above, the rights are typically expressed in REL. To address the issue of usage rights in a bandwidth friendly solution that provides sufficient precision of control, a new REL variable called program category may be used. The program category variable can be small, for example 2 bits, while still providing sufficient usage rights control for some applications. Using three or more bits, however, provides finer-grain control and therefore may desirable. The size of variable, however, is somewhat dependent on the method of delivery. In some embodiments of the invention, instead of using a separate variable, the program category information is embedded in or concatenated with some other identifier, such as the content, program or service identifier.

Figure 30:
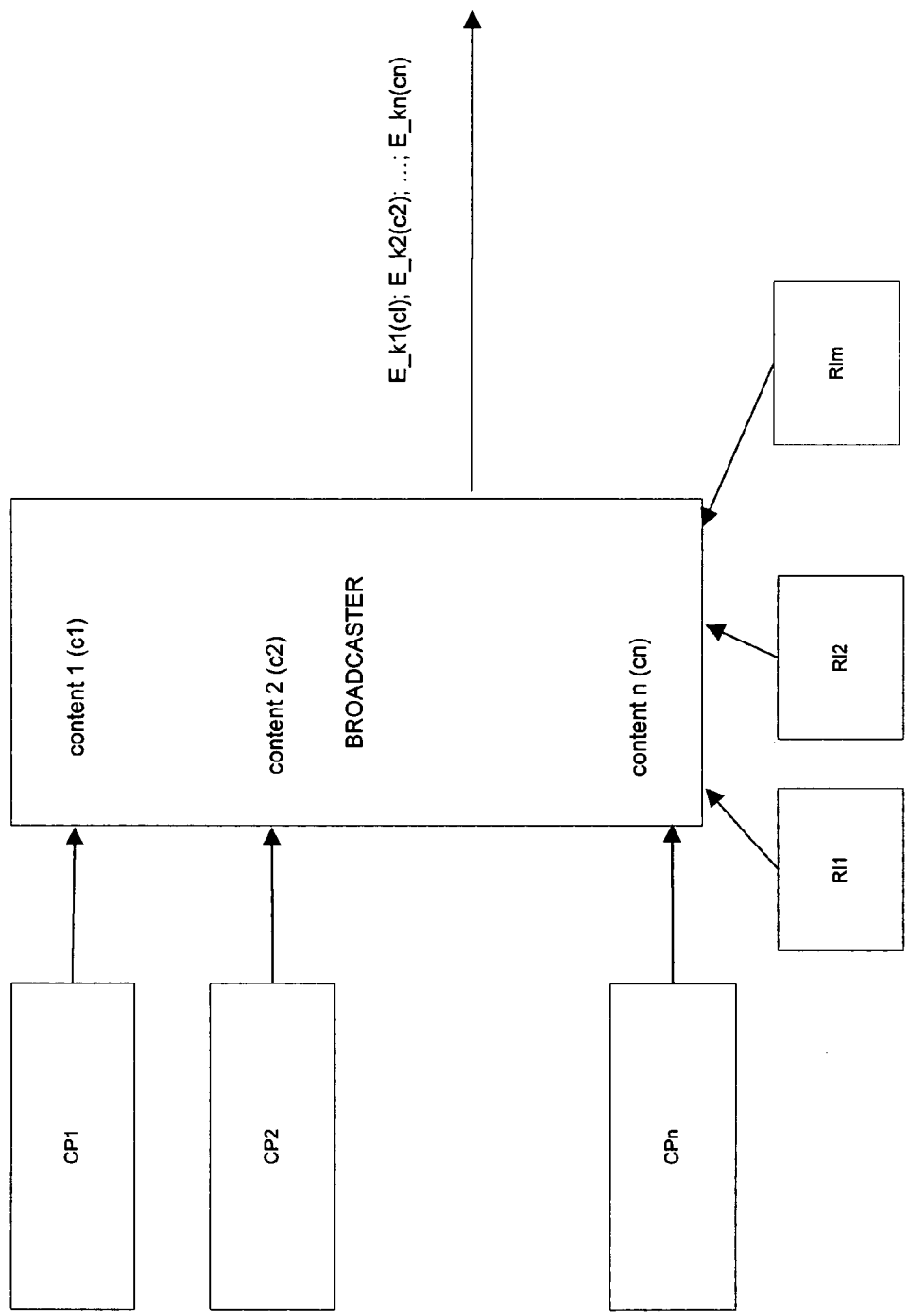
FIG. 30 shows a method of broadcasting streaming content in accordance with an embodiment of the invention.

Looking at FIG. 30, various content providers (CP) provide content to a broadcaster. In addition, various RIs communicate with the broadcaster, either to determine the program categories or to provide the program categories, as will be discussed below. It should be noted that the RIs and CPs may or may not be the same entities. The content is encrypted and then broadcast to the receivers. It should be noted that the content encryption can be made by the content provider or by the broadcaster and the encryption keys are delivered accordingly between the encrypter and rights issuer (RI).

For example, consider a broadcast service and a device. From a particular RI, the device obtains a RO from a particular RI to access certain content, and there is a REL description of the usage rights for the content in the RO. While the description is static for the validity period, the REL may contain usage rights which are conditional to the program category REL variable. Thus, as KSMs change the value of the program category REL variable, the (conditional) usage rights currently in effect may change.

The value of the program category variable may be derived from the KSMs of the broadcast service in question in two alternative ways, discussed below. Since KSMs are sent very frequently, the changes of program category REL variable value and hence the changes in currently effective usage rights may be very fine grained in time. To save broadcast bandwidth, however, the amount of new data added to the KSMs for indicating the program category REL variable preferably is minimized.

Figure 32:
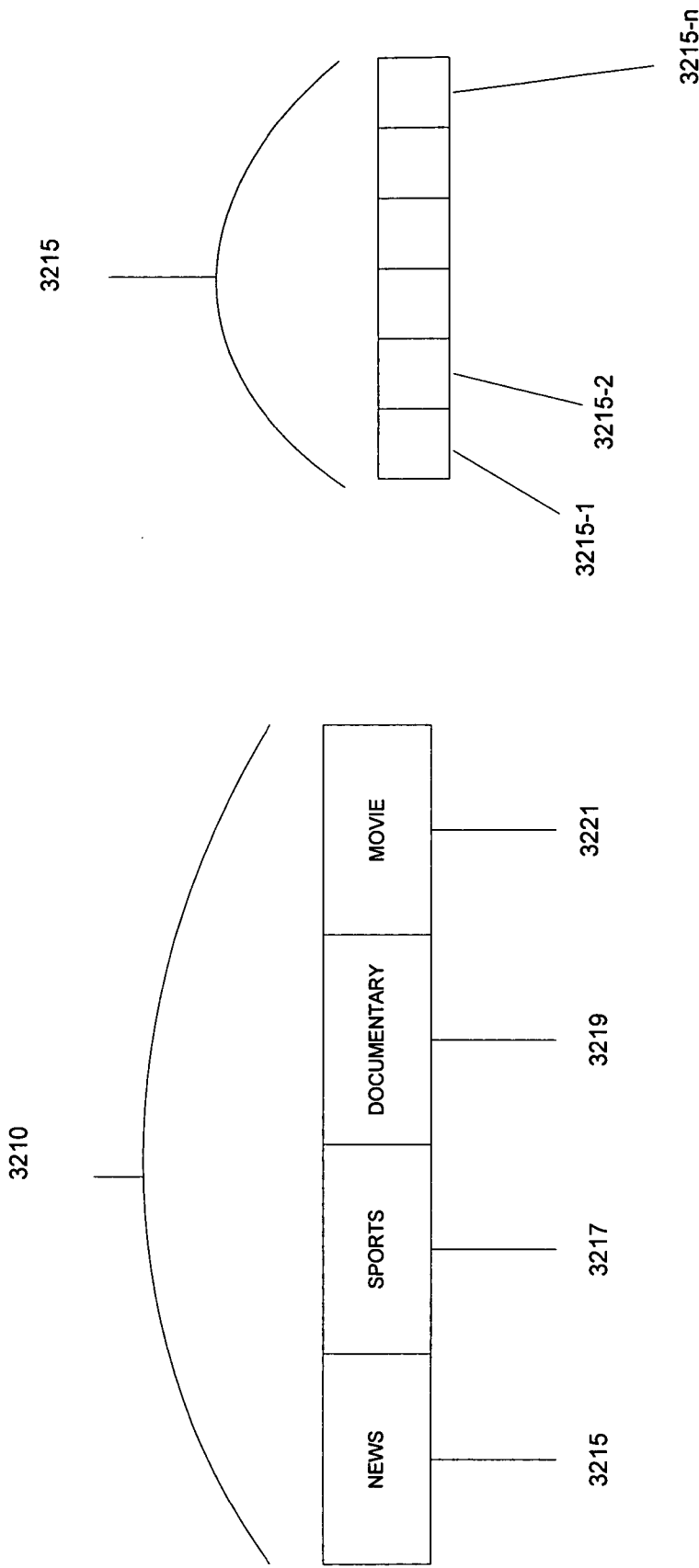
FIG. 32 shows a division of program segments in accordance with an embodiment of the invention.

Before discussing how the program categories may be provided to the receiver, FIG. 32 shows an example of various portions of content. For example, streaming content 3210 may include a news category 3215, a sports category 3217, a documentary category 3219 and a movie category 3221. The news category may be further divided into n categories 3215-1, 3215-2, . . . , 3215-n. These categories may, for example but without limitation, represent headlines, domestic news, foreign news, etc. . . . Similarly, the sports categories 3217 could also be further divided into categories such as highlights, scores, live broadcasting, etc. . . . Alternatively, the categories may not have anything to do with the type of content, but are simply defined for each different set of different usage rights. For example, the categories could be 'highly restricted', 'somewhat restricted', 'normal' and 'liberal', reflecting the permissions given to the user.

Below are two possible methods of providing KSM, the most significant difference is the necessary interaction between the broadcaster and the RIs. It should be noted that some combination of the two methods could also be used.

Looking at the first method of determining the program category for the REL, in an aspect of the invention, the broadcaster "sorts" the streaming content into different categories. For example, the number of program category may be relatively small, such as 4 different categories, or may be relatively large, such as 256 different program categories. Naturally, additional bits will be needed as the number of program categories increases, thus two bits can provide information regarding four program categories while 8 bits are needed to provide 256 program categories. For instance, in a handheld television broadcast service, each television program is categorized into one of a number of program categories, which may include news, low value (lv) shows, high value (hv) shows, lv sports, hv sports, old movies, new movies, etc. RIs cannot influence the categories (set by the broadcaster and common to all RIs), but they can freely use the wide program category REL variable value range (for example, from 0 . . . 255) in their usage rights expressed in REL in the RO they provide to the device. Typically, however, a smaller number, such as 12-16 program categories will be more practical. No extra communication between the broadcaster and the RIs is needed. Each of such program segments may be associated a set usage rights (in the invention report: program category) including 'live rendering', 'storage and display for 48 hours', 'storage and display indefinitely', 'relay and copying (forwarding) indefinitely' or some other similar types.

Thus, the RO may include conditional rights expressed in REL that depend on the value of the program category. Thus, a user might purchase complete rights such that the RO provides the maximum allowable rights for the content. Alternatively, the user may select a promotional free RO that provides much more limited rights and may only allow the display of portions of the streaming content. Periodically the RO will be updated because the SK changes, thus usage rights can vary from RO to RO. The user receives the one or more ROs when ordering/purchasing/subscribing/renewing the service or parts of it. In one embodiment of the invention the user may first receive a 'parent' RO and further 'child' ROs may be acquired or created later. If the user has not ordered (purchased/subscribed) the program segment that is being received, the user is informed on that ('You do not have rights to this program/(program segment)') and/or he is informed how to buy the rights.

Figure 33:
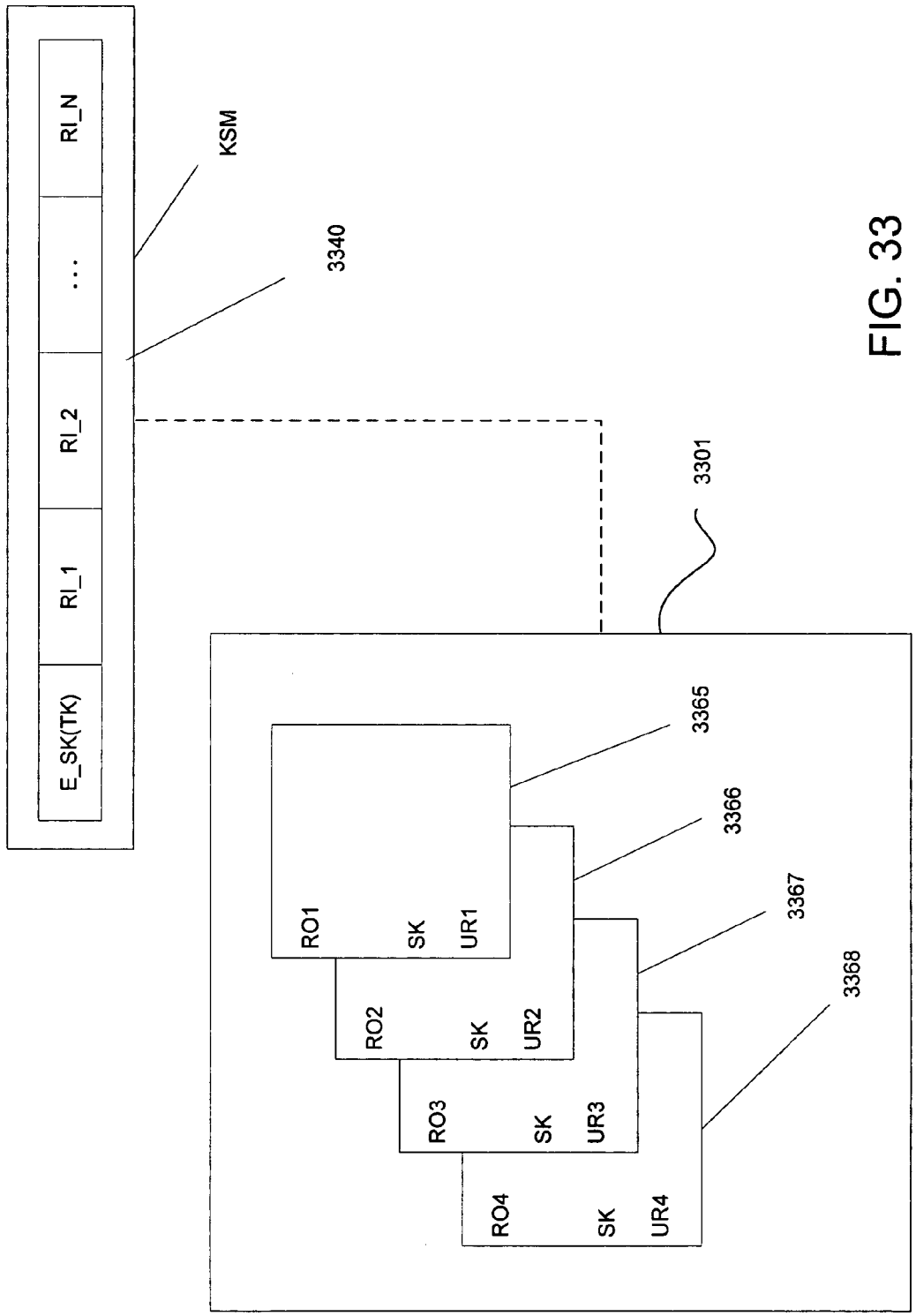
FIG. 33 shows a system for providing using a plurality of rights objects in accordance with an embodiment of the invention.

In another aspect of the invention, as shown in FIG. 33, the RIs set the categories and communicate them to the broadcaster, which then puts the categories into the KSMs. Since there are multiple RIs, it may be useful to limit the number of bits that are allowed per RI to two bits. In such a case, the program category range could be 0 . . . 3. That range, however, would be RI specific, and could therefore directly relate to the usage rights of a particular portion of streaming content (rather than streaming content type in a more generic fashion). In such a case, rather then provide a single RO, four ROs may be provided, each with a set of usage rights configured by the RI.

In the RO mechanism being used in FIG. 33, there must be a means of indicating which category value relates to which RI, preferably without using RI identities (which are larger than two bits). In an embodiment, each KSM 3340 contains a vector of N category values (for some N) where each category value may be two bits. In another embodiment of the invention, the category values may be more than two bits. The ROs provided to the receiver contains an RI index in the range 1 . . . N so that the category value in each of the RI_1 through RI-N corresponds to a set of ROs. Still in other embodiments of the invention one or more bits or combinations of bits within KSM may be used for category values. While the KSM may include the vector, other formats and protocols may be used to provide the category value associated with the RI. In addition, in an embodiment a number of bits and/or bit combinations within the vector may be reserved for future use.

In another embodiment of the invention, a number of bits and/or bit combinations in the KSM, which may or may not have been reserved for other purposes, may be mapped to category values or interpreted as category values. In addition, certain locations within the KSM could be used to provide an indication as to whether a type of program could be viewed. An RO could determine what the category value based on the category value provided by the KSM and then look at the appropriate place in the KSM to determine what usage right existed, such as whether the content could be displayed. As each RO could be configured to look in different locations with the KSM to determine the usage rights, individualized control that may vary with each KSM could readily be provided.

As shown, the user has received in this case four ROs from the RI #I, each with a user rights class. The advantage of using usage rights classes is that the total number and size of rights objects can be smaller than in the case of a complete set of ROs if the usage rights are offered for purchasing on the level of program segments. When the user receives the KSM carrying the actual TK, the bit combination at the position corresponding to the position RI #I allows the user to select the RO that corresponds to his purchase. For example a value of 0 at RI #I would indicate RO1, a value of 1 would indicate RO2, a value of 2 would indicate RO3 and a value of 3 would indicate the RO4. As the TKs may be changed from program segment to program segment, the user may use his rights in the way that he has ordered (purchased). It should be noted that the user is 'listening' to the KSM that has been announced to him (IP address and port number).

For instance, in a handheld television broadcast service, based on television program schedules, RIs choose one of the 4 categories for each program, communicate them to the broadcaster, and the broadcaster then includes the categories into the KSMs. For an RI, the four categories might be 1) live rendering only allowed, 2) storage and replay allowed for 48 hours, 3) storage and replay allowed indefinitely and 4) storage, replay and copying to other devices allowed indefinitely. This example, however, is merely illustrative and other usage right combinations may be provided.

In the above situation all purchasers of the set of RO's from the RI may have the same set of rights. For example, one RI#J in the KSM 3340 may correspond to a particular package deal while a second RI#J+1 may correspond to a different package deal. It should be noted, however, that the program category for each RI is particular to the TK, thus the same set of ROs can provide different usage rights for different TKs, and furthermore, different sets of ROs may provide different sets and/or combinations of usage rights.

Thus, for one set of ROs the RO1 may provide view only usage rights while in another set of ROs the RO1 may provide for time shifting.

Yet, in both solutions, it must be remembered that the conditionality based on the categories only complements the overall usage rights in the RO, making it more dynamic: many usage rights are likely to be unconditional and thus not dependent on program category REL variable value.

Likewise, in both solutions, rather than providing conditionality within the usage rights of a single RO, the program category information sent in the KSM can alternatively be used to select one of a set of complete ROs, or possibly one of several child ROs related to the same parent RO.

Thus, aspects of the present invention provide a bandwidth-efficient way of delivering rights applicable to all subscribers, but which may vary program-by-program and time period by time period, while still allowing the full richness of the REL for defining those rights for each program category. The invention can be applied to IPDC services over DVB-T, DVB-H, MediaFLO, OMA Broadcast and other systems.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method comprising:
   (A) receiving, by a device, a stream of encrypted data corresponding to a single broadcast service from a communications system, the data having different portions encrypted, respectively, by a plurality of traffic keys;
   (B) receiving, by the device, an encrypted key stream message, the encrypted key stream message including the plurality of traffic keys, wherein the encrypted key stream message is separate from the stream of encrypted data; and
   (C) decrypting, by the device, the respective portions of the stream of encrypted data using the plurality of traffic keys.

2. The method of claim 1 further comprising:
   (D) decrypting the encrypted key stream message with a service key.

3. The method of claim 2, further comprising:
   (E) obtaining a rights object, the rights object including the service key; and
   (F) using the respective portions of the stream of decrypted data.

4. The method of claim 1, wherein (B) comprises:
   (i) receiving a program category variable value.

5. The method of claim 3, wherein (F) comprises:
   (i) displaying the respective portions of the stream of decrypted data.

6. The method of claim 3, wherein (F) comprises:
   (i) storing the respective portions of the stream of decrypted data.

7. The method of claim 3, wherein the use of the respective portions of the stream of decrypted data is controlled by a usage right associated with the rights object.

8. The method of claim 2, further comprising:
   (E) repeating (A), (B), (C) and (D) after one or more of the traffic keys change.

9. The method of claim 3, wherein the rights object further includes a usage right associated with a program category variable value included in the key stream message and (F) is controlled by the usage right.

10. An apparatus comprising:
    at least one processor; and
    at least one memory including computer program code, the at least one memory and the computer program code, with the at least one processor, cause the apparatus to perform at least the following:
    (A) receive a stream of encrypted data corresponding to a single broadcast service from a communications system, the data having different portions encrypted by a plurality of traffic keys;
    (B) receive an encrypted key stream message, the encrypted key stream message including the plurality of traffic keys, wherein the encrypted key stream message is separate from the stream of encrypted data; and
    (C) decrypt the respective portions of the stream of encrypted data using the plurality of traffic keys.

11. The apparatus of 10, wherein the apparatus to further perform at least the following:
    (D) decrypt the key stream message with a service key.

12. The apparatus of claim 11, wherein the apparatus to further perform at least the following:
    (E) obtain a rights object, the rights object including the service key; and
    (F) display the respective portions of the stream of decrypted data.

13. The apparatus of claim 10, wherein (B) comprises:
    (i) receiving a program category variable value.

14. The apparatus of claim 11, wherein the apparatus to further perform at least the following:
    (E) repeat (A), (B), (C), (D) after one or more of the traffic keys change.

15. The apparatus of claim 12, wherein the rights object further includes a usage right associated with a program category variable value included in the key stream message and (F) is controlled by the usage right.

* * * * *